United States Patent
Romocki

(10) Patent No.: US 10,502,368 B2
(45) Date of Patent: Dec. 10, 2019

(54) INDIRECT FLUID HEATER

(71) Applicant: Intelliheat Solutions Ltd., London (GB)

(72) Inventor: Stefan Martin Romocki, London (GB)

(73) Assignee: INTELLIHEAT SOLUTIONS LTD., London (GB)

( * ) Notice: Subject to any disclaimer, the term of this patent is extended or adjusted under 35 U.S.C. 154(b) by 343 days.

(21) Appl. No.: 14/914,536

(22) PCT Filed: Aug. 29, 2014

(86) PCT No.: PCT/GB2014/052638
§ 371 (c)(1),
(2) Date: Feb. 25, 2016

(87) PCT Pub. No.: WO2015/028823
PCT Pub. Date: Mar. 5, 2015

(65) Prior Publication Data
US 2016/0208973 A1    Jul. 21, 2016

(30) Foreign Application Priority Data

Aug. 29, 2013  (GB) .................................. 1315399.4

(51) Int. Cl.
*F17D 1/02* (2006.01)
*F28D 1/02* (2006.01)
(Continued)

(52) U.S. Cl.
CPC .................. *F17D 1/02* (2013.01); *F02C 1/02* (2013.01); *F16L 53/32* (2018.01); *F17D 1/05* (2013.01);
(Continued)

(58) Field of Classification Search
CPC .... F16L 53/32; F17D 1/02; F17D 1/05; F28D 1/0213; F28D 15/0266; F28D 2021/0064; F02C 1/02
(Continued)

(56) References Cited

U.S. PATENT DOCUMENTS 1,845,023 A † 2/1932 Jennings
2,105,435 A   1/1938 Tanner et al.
(Continued)

FOREIGN PATENT DOCUMENTS

EP  0 453 007 A2  10/1991
FR  2 628 829 A1  9/1989
(Continued)

OTHER PUBLICATIONS

Angelo, W.; Mantelli, M.H.; and Milanez, F.H.: "Design of a Heater for Natural Gas Stations by Two-Phase Loop Thermosyphon", 14th International Heat Pipe Conference, Brazil, Apr. 22-27, 2007.*

(Continued)

*Primary Examiner* — Steven B McAllister
*Assistant Examiner* — Benjamin W Johnson
(74) *Attorney, Agent, or Firm* — Jeffrey T. Knapp; Advent, LLP

(57) ABSTRACT

The present invention relates to a heater suitable for heating a flow of natural gas. There is provided a heater (1) suitable for heating a flow of natural gas, comprising a vessel (2) containing a heat transfer fluid, a heat source tube (3) passing through the vessel and being at least partially immersed in the heat transfer fluid, the heat source tube (3) being suppliable with heated gas to allow the heated gas to flow along the heat source tube (3) to evaporate the heat transfer fluid and at least one heat exchanger being connectable to a source of second fluid (9) to be heated, the heat (Continued)

exchanger being arranged so that the second fluid can be heated by the evaporated heat transfer fluid.

17 Claims, 21 Drawing Sheets

(51) Int. Cl.
    *F02C 1/02*     (2006.01)
    *F16L 53/32*     (2018.01)
    *F28D 15/02*     (2006.01)
    *F17D 1/05*     (2006.01)
    *F28D 21/00*     (2006.01)

(52) U.S. Cl.
    CPC ....... *F28D 1/0213* (2013.01); *F28D 15/0266* (2013.01); *F28D 2021/0064* (2013.01)

(58) Field of Classification Search
    USPC ........................................ 122/33, 31.1, 31.2
    See application file for complete search history.

(56) References Cited

U.S. PATENT DOCUMENTS

| | | | | |
|---|---|---|---|---|
| 3,241,530 | A * | 3/1966 | Blockley | F22B 7/12 |
| | | | | 122/410 |
| 4,384,549 | A | 5/1983 | Enga | |
| 4,393,663 | A | 7/1983 | Grunes et al. | |
| 4,803,343 | A | 2/1989 | Sotani et al. | |
| 5,527,180 | A * | 6/1996 | Robinson | F23D 11/00 |
| | | | | 431/188 |
| 5,749,328 | A * | 5/1998 | Guillet | F24H 8/003 |
| | | | | 122/209.1 |
| 5,950,573 | A * | 9/1999 | Shellenberger | F23D 14/82 |
| | | | | 122/18.31 |
| 2007/0000453 | A1 | 1/2007 | King | F28D 1/0213 |
| | | | | 122/31.1 |
| 2010/0146943 | A1 | 6/2010 | Muramatsu et al. | |
| 2012/0137989 | A1* | 6/2012 | Van Wyk | F22B 9/12 |
| | | | | 122/236 |
| 2013/0025696 | A1* | 1/2013 | Yang | F16L 55/05 |
| | | | | 137/14 |
| 2013/0112155 | A1* | 5/2013 | Abdel-Rehim | F24H 1/206 |
| | | | | 122/15.1 |

FOREIGN PATENT DOCUMENTS

| | | |
|---|---|---|
| FR | 2 916 522 A1 | 11/2008 |
| GB | 1 260 220 | 1/1972 |
| GB | 1 462 758 | 1/1977 |
| JP | 2009-74494 A | 4/2009 |
| WO | 2008026960 A1 † | 8/2006 |
| WO | WO 2008/026960 A1 | 3/2008 |
| WO | WO 2011/034999 A1 | 3/2011 |
| WO | WO 2012/160433 A1 | 11/2012 |
| WO | WO 2013/104885 A1 | 7/2013 |

OTHER PUBLICATIONS

Zuo, Z.J. and Faghri, A.: "A Network Thermodynamic Analysis of the Heat Pipe"; Int'l. J. Heat Mass Transfer, vol. 41, No. 11, pp. 1473-1484, 1998.

Kim, Chul Ju; Yoo, Byoung Ok; Park, Yong Joo: "An Experimental Study of a Two-Phase Closed Loop Thermosyphon with Dual Evaporator in Parallel Arrangement", Journal of Mechanical Science and Technology, vol. 19, No. 1, pp. 189-198, 2005.

Franco, Alessandro; Filippeschi, Sauro: "Closed Loop Two-Phase Thermosyphon of Small Dimensions: A Review of the Experimental Results", Microgravity Sci. Techol. 2012.

Angelo, W.; Mantelli, M.H.; Milanez, F.H.: "Design of a Heater for Natural Gas Stations Assisted by Two-Phase Loop Thermosyphon", 14th International Heat Pipe Conference, Brazil, Apr. 2007.

Dipprey, D.F.; Sabersky, R.H.: "Heat and Momentum Transfer in Smooth and Rough Tubes at Various Prandtl Numbers", Int. J. Heat Mass Transfer, vol. 6, pp. 329-353, 1963.

Noie, S.H.: "Heat Transfer Characteristics of a Two-Phase Closed Thermosyphon", Applied Thermal Engineering, pp. 495-506, 2005.

Ziapour, Behrooz Mirzaei; Shaker, Hadi: "Heat Transfer Characteristics of a Two-Phase Closed Thermosyphon Using Different Working Fluids", Heat Mass Transfer, 2010.

Noie, S.H.; Heris, S. Zeinali; Kahani, M.; Nowee, S.M.: "Heat Transfer Enhancement Using Al2O3 water nanofluid in a two-phase closed thermosyphon", International Journal of Heat and Fluid Flow 30, pp. 700-705, 2009.

Holman, J.P.: "Heat Transfer"; McGraw-Hill Series in Mechanical Engineering, 2002, pp. 215-218.

* cited by examiner
† cited by third party

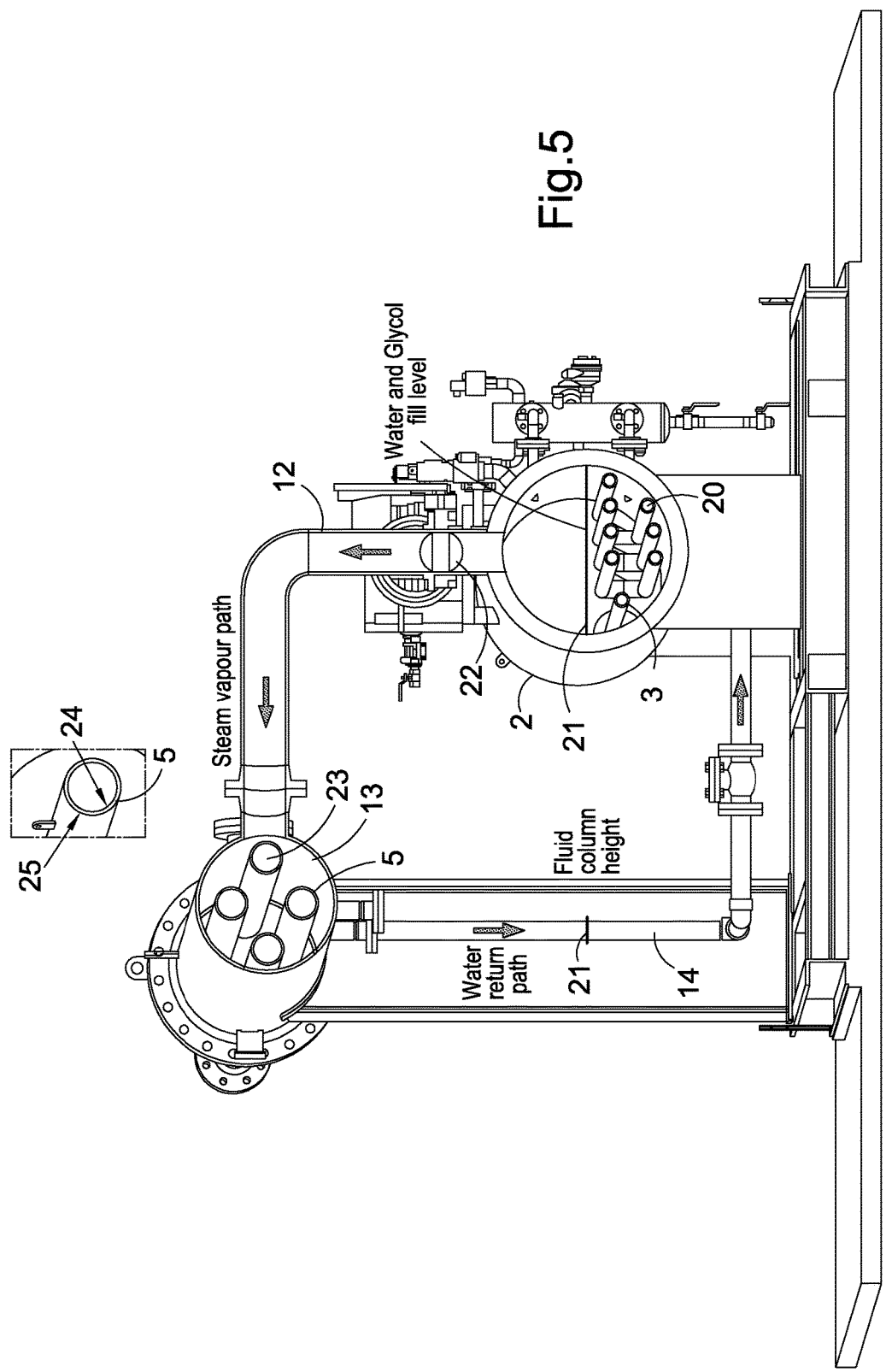

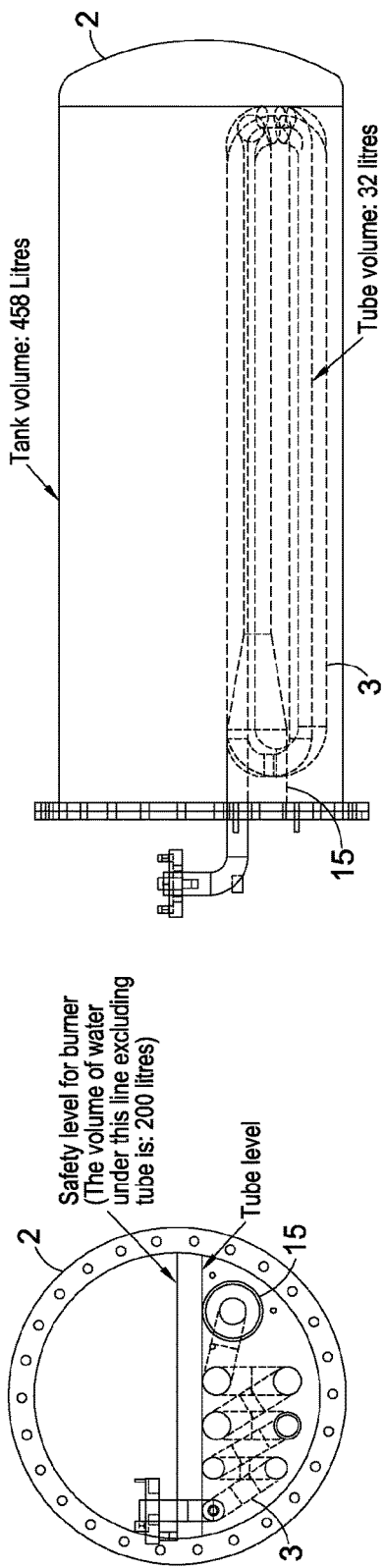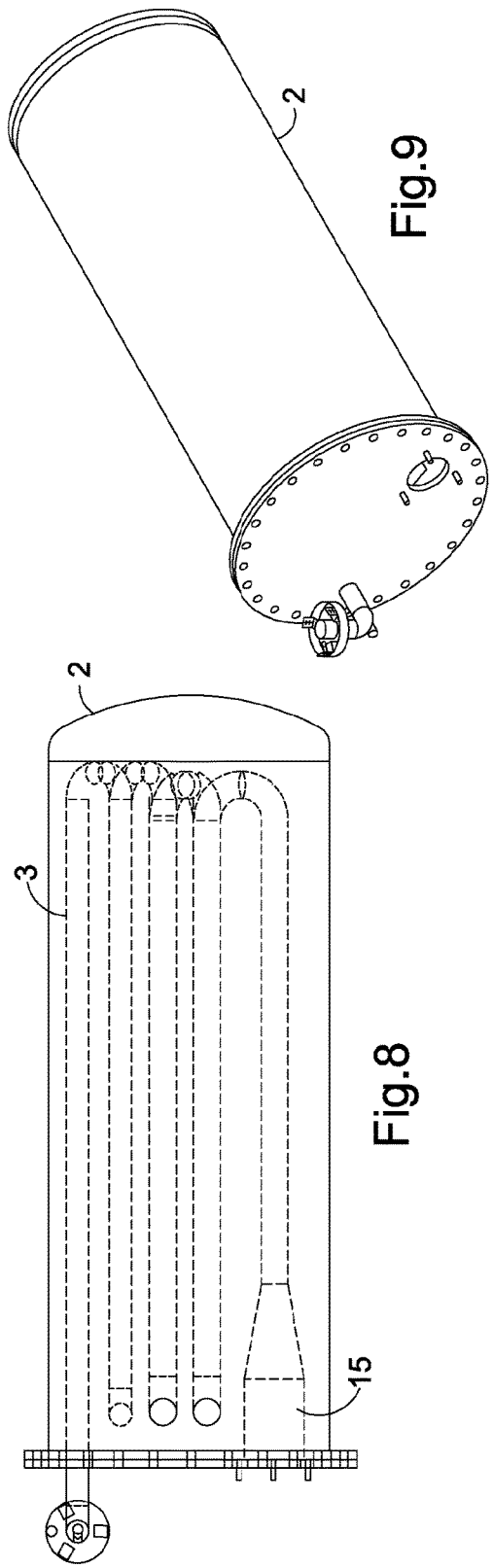

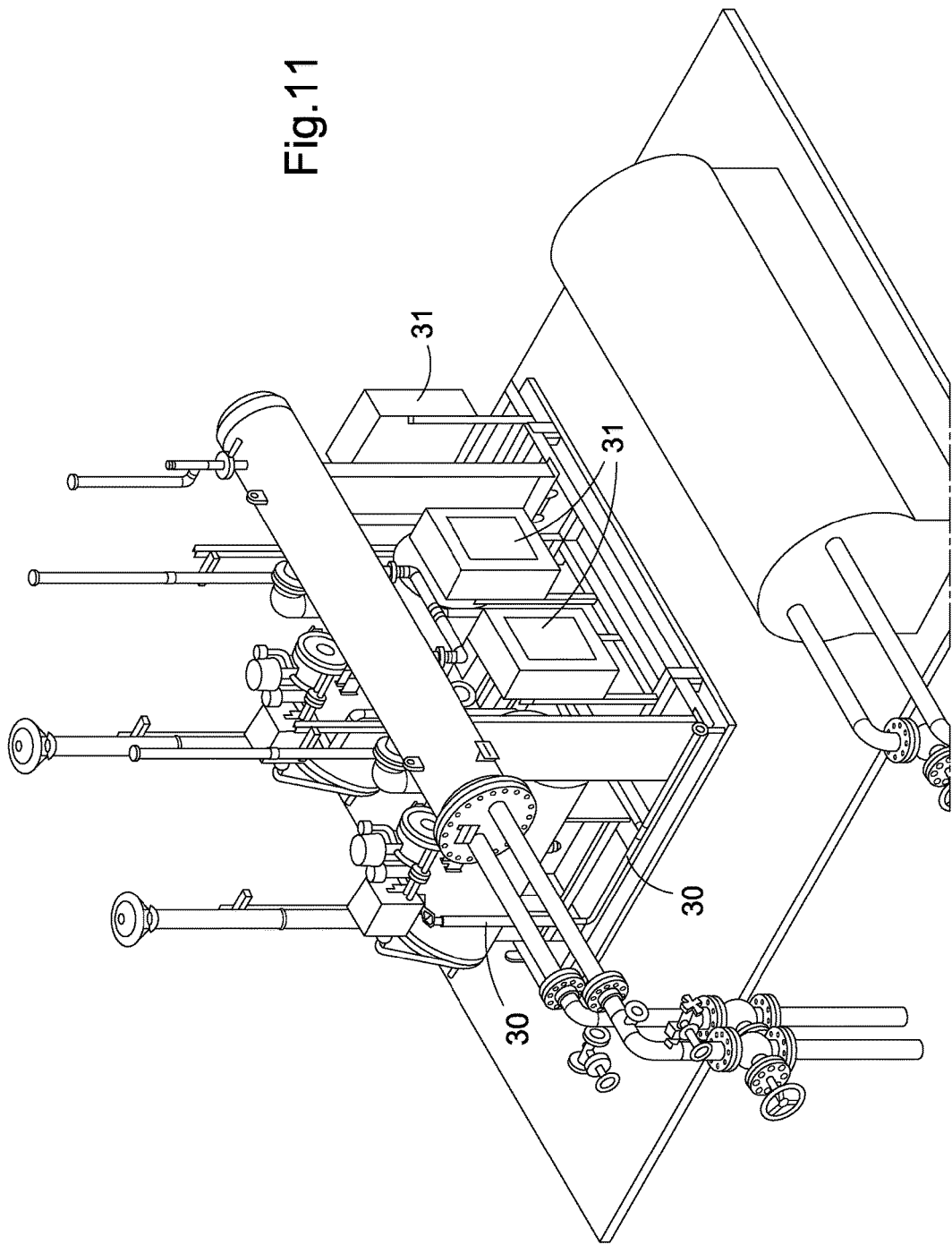

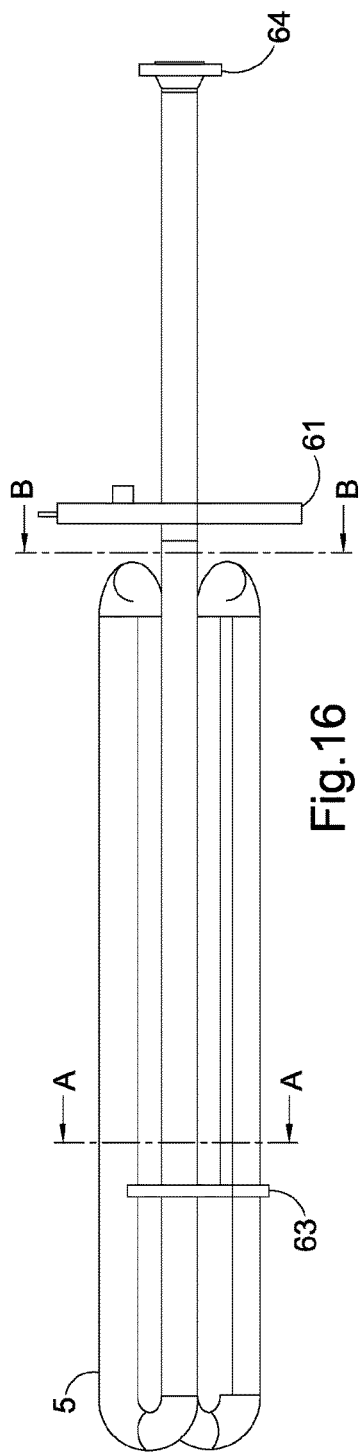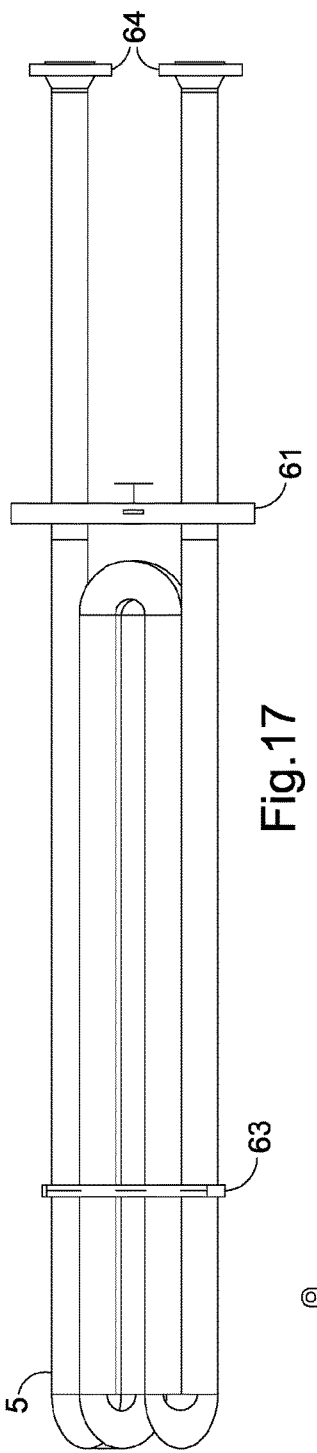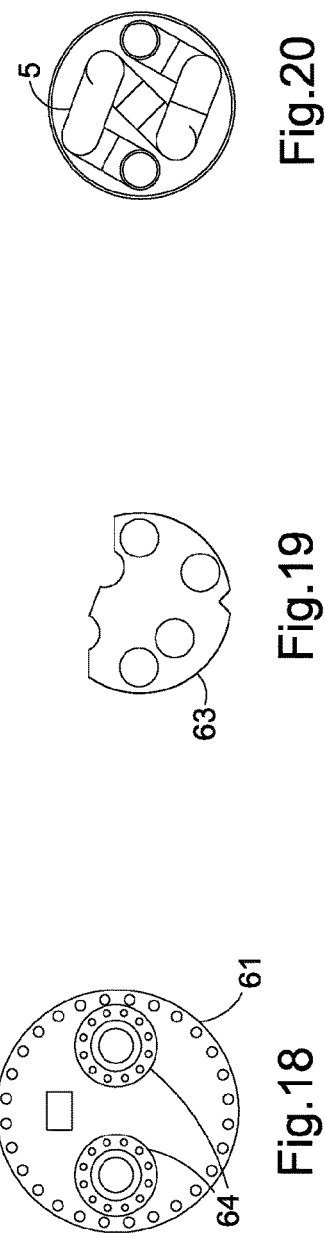

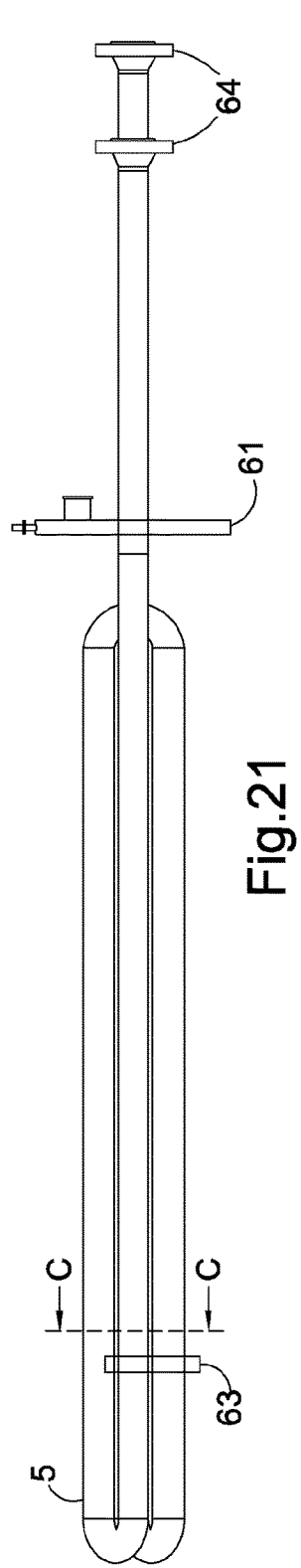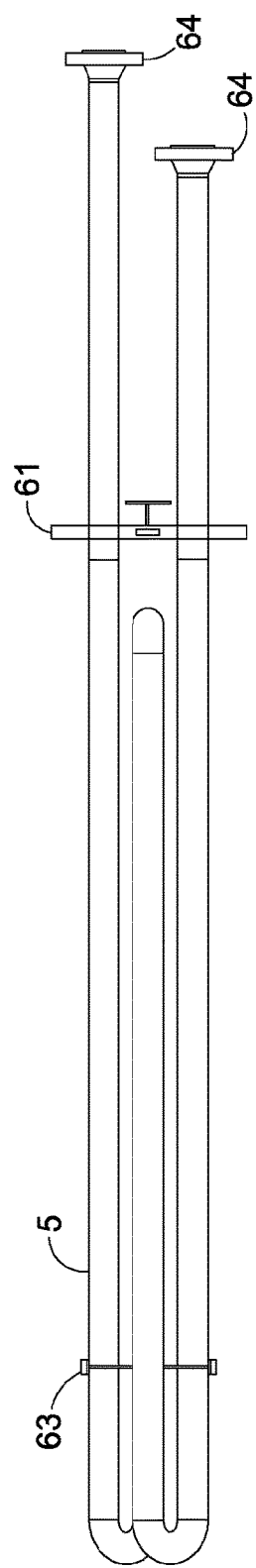

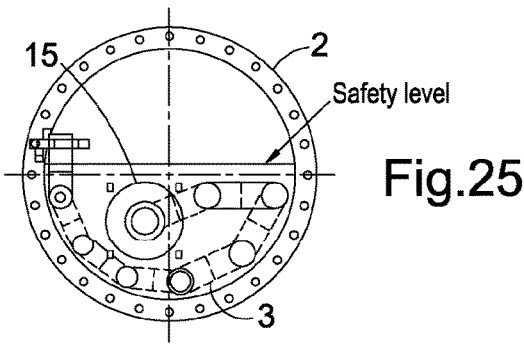
Fig.25
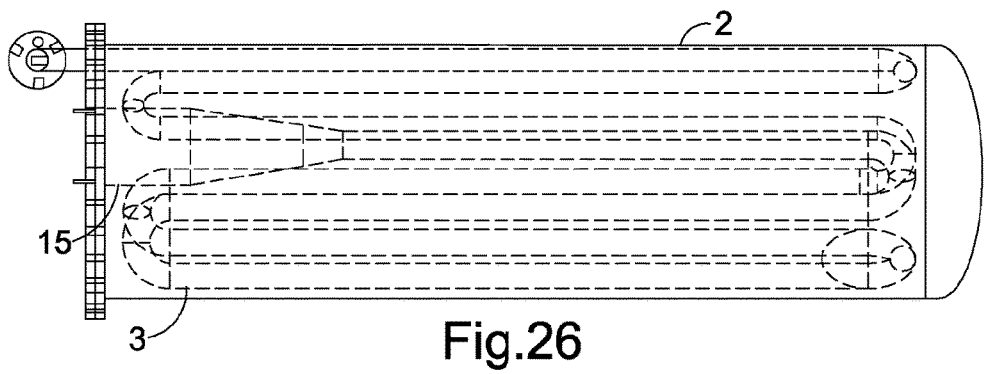
Fig.26
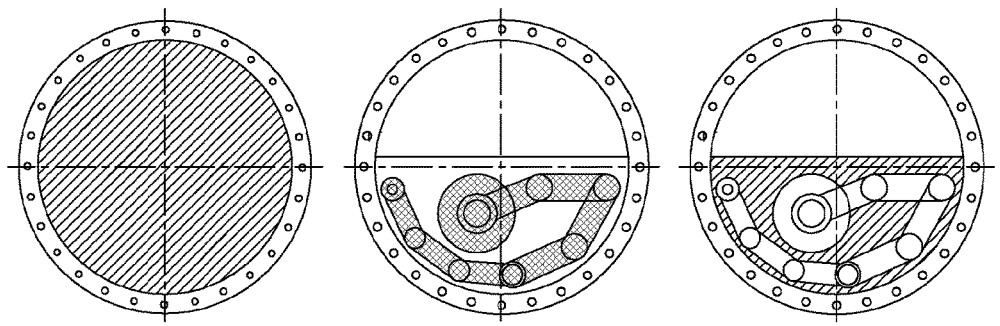
Full Vessel Volume:
944 litres
Tube Volume: 85 litres
Liquid Volume:
524-85 litres = 439 litres
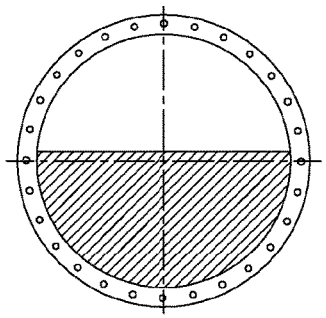
Under safety level volume
524 litres
Fig.27

INDIRECT FLUID HEATER

The present invention relates to a heater suitable for heating a flow of natural gas. The heater is also suitable for heating flows of liquids, for example on chemical processing sites, or fuel gas for powers stations, or air or other fluids or media that can flow.

Natural gas is typically transported in pipelines over large distances at high pressures e.g. 17 to 75 bar gauge. For domestic consumption, the gas must be let-down from the pipeline pressures to lower pressures e.g. 2 to 7 bar gauge. During the pressure let-down process, the temperature of the gas drops due to the Joule-Thomson effect. The pressure let-down process is carried out in a pressure reducing station. Natural gas typically enters the pressure reducing station at 4 to 6° C. Pressure let-down of the gas from such temperatures and pressures can result in the temperature of the gas falling below the condensation temperature (e.g. 0° C.), causing gas hydrates to form downstream of the pressure reducing station, which may lead to equipment damage or pipeline blockage. Therefore, preheaters have been used to heat the natural gas before it enters the pressure reducing station in order to maintain temperature of the gas leaving the pressure reducing station above the condensation temperature (e.g. 0° C.).

It has been found that direct heating of the natural gas in the pipeline using for example hot flue gases is difficult to control and therefore potentially unsafe because the pipeline and gas may become overheated. Therefore, ways of heating the pipeline indirectly, using a heat transfer fluid have been proposed.

Most prior art indirect heat transfer systems use water in liquid form to transfer heat, but water is a relatively poor heat carrier. In such prior art systems, if more heat transfer is required, a higher volume of water is required, which results in a higher "thermal inertia". That is, a large mass of heat transfer fluid has to be heated. This in turn reduces the responsiveness of the system to changes in heating requirements.

U.S. Pat. No. 7,841,305 discloses an apparatus for heating a natural gas supply line indirectly, using a heat transfer fluid. The apparatus has a burner assembly provided below a sump containing heat exchange fluid to heat the heat exchange fluid. Heat exchange tubes are provided in an exhaust chamber above the burner assembly and are heated by the burner assembly. The tubes are open-ended and the heat exchange fluid can pass through the tubes and is heated by the tubes.

However, the apparatus has a drawback in that the transfer of heat from the tubes to the heat exchange fluid is relatively inefficient. The apparatus is also limited in its configuration because the sump is provided above the burner assembly in order to be heated by the exhaust chamber.

The apparatus also has a main chamber. Part of the main chamber is the sump in which the heat exchange fluid is provided. The heat exchange fluid can evaporate and pass into the rest of the main chamber. In one form of the apparatus, pipes pass through the main chamber containing natural gas, and the evaporated heat exchange fluid heats the pipes. In another form of the apparatus, the evaporated heat transfer apparatus passes from the main chamber into pipes in a looped configuration, and the pipes are used to heat a fluid contained in a storage tank.

The first form of the apparatus has the drawback that the flow of natural gas must be brought close to the burner assembly, or the main chamber would need to be expanded. This drawback is partially offset by the second form of the apparatus. However, the second form of the apparatus would not heat a flow of natural gas effectively.

The present invention seeks to mitigate at least one of the drawbacks mentioned above.

In a first aspect of the present invention there is provided a heater suitable for heating a flow of natural gas, comprising a vessel containing a heat transfer fluid, a heat source tube passing through the vessel and being at least partially immersed in the heat transfer fluid, the heat source tube being suppliable with heated gas to allow the heated gas to flow along the heat source tube to evaporate the heat transfer fluid and at least one heat exchanger being connectable to a source of second fluid, the heat exchanger being arranged so that the second fluid can be heated by the evaporated heat transfer fluid.

In the first aspect of the invention, heat is transferred from the heated gas flow inside the heat source tube to the heat transfer fluid outside the heat source tube through the walls of the heat source tube. In other words, the heat source tube is provided in a bath of heat transfer fluid. This provides improved radiant heat transfer because heat can radiate from the heat source tube further into the vessel to heat the heat transfer fluid in comparison to the apparatus of U.S. Pat. No. 7,841,305. Indeed, heat can radiate onto the inner walls of the vessel. This provides a significant improvement in heat transfer efficiency in comparison to the prior art apparatus. In particular, approximately 95-98% heat transfer efficiency can be obtained according to the first aspect of the invention, in comparison to approximately 70% efficiency with the prior art apparatus.

The change of phase of the heat transfer fluid from liquid to gas allows large amounts of heat to be transferred without a significant change in temperature of the heat transfer fluid. Much of this heat transfer makes use of the latent heat of vaporisation of the heat transfer fluid. Less heat transfer fluid is required, and so smaller vessels and less associated pipework can be used.

The higher heat transfer coefficient of steam condensation as compared to hot water in a single phase results in a 50-60% reduction in the surface area required to achieve an equivalent amount of heat transfer. This allows a higher efficiency per unit of surface area, and a smaller system is required with a more compact design. A smaller mass of heat transfer fluid is required i.e. a lower heat transfer fluid fill level in the vessel is required. The smaller mass of heat transfer fluid means that the system is more responsive to changes in system heat transfer requirements.

Preferably, the at least one heat exchanger comprises at least one heat transfer tube being connectable to a source of second fluid, the at least one heat transfer tube being arranged to be heated by the evaporated heat transfer fluid.

If the heat transfer fluid is water, 1 kg of water evaporated to steam would absorb approximately 2250 kJ of energy as it changes state. This steam may then travel to the at least one heat transfer tube and condense on the outer surface of the tube. The tube may contain natural gas to be heated, typically at 4 to 6° C. As the steam condenses the 2250 kJ of latent heat is released in addition to any sensible heat due to the difference in temperature between the heat transfer fluid and the natural gas.

Therefore, using a two-phase system means that 1 kg of water as the heat transfer fluid is used far more effectively than the 1 kg of water of the single-phase prior art systems. Hence reduced volumes of water can be used, which reduces thermal inertia and optimizes heat transfer. Up to 95% less water is required in a two-phase system.

Alternatively, the at least one heat exchanger may comprise a heat transfer vessel being connectable to a source of second fluid, the at least one heat transfer vessel being arranged to be heated by the evaporated heat transfer fluid.

The heat transfer vessel may be heated by a condenser tube passing through the heat transfer vessel, the condenser tube being in fluid communication with the vessel containing heating transfer fluid to allow heat transfer fluid to flow between the vessel and the condenser tube. The evaporated heat transfer fluid could then condense on the inner surface of the condenser tube. This would transfer heat to the second fluid outside the condenser tube.

The heat transfer vessel may take any of the preferable forms of the condenser vessel described below except that it would be connectable to a source of second fluid and would not be in fluid communication with the evaporator vessel to allow heat transfer fluid to flow between the evaporator vessel and the condenser vessel. Additionally, the condenser tube may take any of the preferable forms of the at least one heat transfer tube described below except that it would not be connectable to a source of second fluid and would be in fluid communication with the evaporator vessel to allow heat transfer fluid to flow between the evaporator vessel and the condenser tube or vessel. Hence the forms of the at least one heat transfer tube and condenser vessel described below are interchangeable.

Preferably the heater is a fluid heater i.e. it heats fluid, and more preferably is a gas heater i.e. it heats gas.

The heat source tube may be suppliable with heated gas from a source external or internal to the vessel. Preferably, the source is a burner that burns fuel gas inside the vessel.

Preferably, a single heat source tube passes through the vessel. Preferably, a single heat transfer tube is provided. This provides a simple design that is cheaper to manufacture and is less likely to malfunction. For example, a single hairpin tube in pipe exchanger is employed using minimal welds. However, a TEMA (Tubular Exchanger Manufacturers Association) tube can also be used.

Alternatively, two or more heat source tubes may pass through the vessel.

The at least one heat transfer tube may pass through the vessel. Thus heat transfer from the heat source tube to the at least one heat transfer tube can take place in the same vessel.

Preferably, the at least one heat transfer tube is heated by the heat transfer fluid through the outer surface of the at least one heat transfer tube.

Preferably, the vessel is an evaporator vessel, the heater further comprising a condenser vessel being in fluid communication with the evaporator vessel to allow heat transfer fluid to flow between the evaporator vessel and the condenser vessel, and the at least one heat transfer tube passing through the condenser vessel. Providing separate evaporator and condenser vessels allows the fluid (preferably natural gas) to be heated remotely from the heating of the heat transfer fluid. Thus a more flexible arrangement is provided in comparison to an arrangement wherein the heating of the heat transfer fluid and the heating of the both take place in the same vessel.

Preferably, a single heat transfer tube passes through the condenser vessel. However, plural heat transfer tubes may pass through the condenser vessel.

Furthermore, the modular nature of the heater in providing separate evaporator and condenser vessels improves serviceability and reliability of the heater. If either of the evaporator or condenser vessels malfunctions, the vessel can be more easily reached and maintained by the repairer, and safe and simple isolation of the vessel is possible to allow safe repairs to be completed with minimal effort.

Additionally, providing separate evaporator and condenser vessels helps to reduce the footprint of the heater.

Preferably, the condenser vessel is in fluid communication with the evaporator vessel to allow heat transfer fluid to flow between the evaporator vessel and the condenser vessel in a circuit. This allows the heat transfer fluid to be reused. The flow in a circuit preferably uses a fixed mass of heat transfer fluid.

Preferably, the circuit comprises a feed tube for evaporated heat transfer fluid and a return tube for condensed heat transfer fluid.

Preferably, the centre of gravity of the condenser vessel is above the centre of gravity of the evaporator vessel in the operating condition of the heater. In this arrangement, when the heat transfer fluid is heated and evaporates, the evaporated fluid can flow from the evaporator vessel to the condenser vessel by natural convection. Conversely, the heat transfer fluid, once it has condensed, can flow back to the evaporator by gravity. This obviates the need for a pump to move the heat transfer fluid between the vessels. Otherwise a complex pump would be required which is often unreliable and requires detailed maintenance regimes. The heater can thus act as a two-phase thermosyphon.

Preferably, the pressure in the vessel is maintained below atmospheric pressure. The use of a partial vacuum allows the temperature at which the heat transfer fluid evaporates to be reduced. Thus the heat absorption during the phase change of the heat transfer fluid can be used at a lower temperature. Preferably, the absolute pressure in the vessel is 50 to 340 mbar. If the heat transfer fluid comprises water, typical boiling temperatures of the water at such pressures are 40 to 90° C., but typically 65° C.

Preferably, the heat transfer fluid comprises water.

Preferably, the heat transfer fluid comprises propylene glycol or ethylene glycol, more preferably non-toxic ethylene glycol. The glycol stores heat around the vessel so that it can be transferred to the other component of the heat transfer fluid to cause the other component to evaporate. The glycol distributes heat around the vessel more effectively. The glycol also acts as an antifreeze, protecting the evaporators from ice formation in low ambient temperatures.

Preferably, the vessel is substantially cylindrical. A cylindrical vessel is useful if a vacuum is used inside the vessel. Alternatively, the vessel may be rectangular, cubic or spherical.

Preferably, the cylindrical vessel has a longitudinal axis, and the vessel is arranged so that the longitudinal axis is substantially horizontal in the operating condition of the heater. The heat source tube preferably has a straight section that is substantially parallel to the longitudinal axis of the cylindrical vessel. This can help to reduce the volume of heat transfer fluid required to immerse the heat source tube.

Preferably, the heater does not further comprise a pump for moving the heat transfer fluid. This may be the case if the heat transfer fluid is moved between the heat source tube and the at least one heat transfer tube due to natural convection. The system is thus simplified.

Preferably, the heat source tube follows an at least partially curved path inside the vessel.

Preferably, the heat source tube overlaps itself. This allows tighter packing of the heat source tube, increased heat transfer and a lower volume of heat transfer fluid.

Preferably, the heat source tube follows a sinuous path.

Preferably, the heat source tube has an inlet where the heat source tube enters the vessel and an outlet where the heat source tube leaves the vessel, and the cross-sectional area bounded by the heat source tube decreases in the direction inlet to outlet along at least part of its length, more preferably along its full length. The tapering of the heat source tube allows the velocity of the heated gas flow to vary, in particular to increase along the tapering section. All other things being equal, an increased velocity of flow will lead to improved heat transfer. However, as the tube tapers, the inner surface area of the tube decreases. The inventor has worked to optimise the heat transfer in the tapering tube to balance the increased velocity with the decreased surface area. The decreased surface area of the heat source tube provides the advantage that a more compact system can be provided.

Alternatively, the heat source tube may be tapered in the direction outlet to inlet along at least part of its length, more preferably along its full length.

In achieving a tapering of the heat source tube, the tube may be made up of several sections of respectively smaller or larger internal dimension, or may be made up of a section, the internal dimension of which increases or decreases, or more than one such section. The sections may be substantially straight or may be curved.

Preferably, the space bounded by the heat source tube is circular in cross-section. Preferably, the space bounded by the at least one heat transfer tube is circular in cross-section.

Preferably, the vessel is partially filled with heat transfer fluid; more preferably, the vessel is less than half filled with heat transfer fluid; most preferably, the vessel is less than a quarter filled with heat transfer fluid. Preferably, the heat transfer fluid fills the tank to a level that only just immerses the heat source tube. The heat transfer fluid fill level is optimised to contain the minimum fluid for the proposed heat transfer system.

Preferably, the heat source tube follows a substantially horizontal path inside the vessel in the operating condition of the heater. Thus a minimum of heat transfer fluid can be used.

Preferably, the condenser vessel is substantially cylindrical.

Preferably, the cylindrical condenser vessel has a longitudinal axis, and the condenser vessel is arranged so that the longitudinal axis of the condenser vessel is substantially horizontal in the operating condition of the heater.

Preferably, the operating temperature range of the heat transfer fluid is 40 to 90° C., more preferably 40 to 65° C. The operating temperature range is the range of temperature at which the heat transfer fluid is in the vapour phase and is able to transfer heat from the heat source tube to the at least one second fluid. Of course the evaporation temperature of the heat transfer fluid must be below the temperature at which the heat transfer fluid is in the vapour phase.

Preferably, the ratio of the volume of the vessel to the volume displaced by the heat source tube inside the vessel is between 20:1 and 5:1.

For example, for a vessel capable of 120 kW of heat transfer by evaporation, the total volume of the vessel may be 458 litres. The volume displaced by the heat source tube may be 32 litres. The ratio of volume of the vessel to the volume displaced by the heat source tube would be therefore 14.3:1.

As another example, for a vessel capable of 240 kW of heat transfer by evaporation, the total volume of the vessel may be 944 litres. The volume displaced by the heat source tube may be 85 litres. The ratio of volume of the vessel to the volume displaced by the heat source tube would be therefore 11.1:1. Such a vessel is shown in FIGS. 25-27. See FIG. 27 for an illustration of the volumes of the various different elements.

As another example, for a vessel capable of 900 kW of heat transfer by evaporation, the total volume of the vessel may be 3528 litres. The volume displaced by the heat source tube may be 461 litres. The ratio of volume of the vessel to the volume displaced by the heat source tube would be therefore 7.65:1.

Preferably, the ratio of the total volume of heat transfer fluid when condensed to the volume displaced by the heat source tube is less than 20:1, more preferably less than 15:1, even more preferably less than 10:1, most preferably less than 7:1. This ratio represents the thermal inertia of the system. The configuration of the heater allows this ratio and hence the thermal inertia of the system to be kept to a minimum, and the system is thus more responsive to heating requirements. This is a significant advantage over existing heating systems which often have a large thermal inertia and therefore low responsiveness.

For example, for the vessel capable of 120 kW of heat transfer by evaporation with a total volume of the vessel of 458 litres, 148 litres of condensed heat transfer fluid are required for safe operation of the burner. The ratio of volume of condensed heat transfer fluid required for safe operation to the volume displaced by the heat source tube would be therefore 4.6:1 (148/32).

As another example, for the vessel capable of 240 kW of heat transfer by evaporation with a total volume of the vessel of 944 litres, 439 litres of condensed heat transfer fluid are required for safe operation of the burner. The ratio of volume of condensed heat transfer fluid required for safe operation to the volume displaced by the heat source tube would be therefore 5.16:1 (439/85).

As another example, for the vessel capable of 900 kW of heat transfer by evaporation with a total volume of the vessel of 3528 litres, 1897 litres of condensed heat transfer fluid are required for safe operation of the burner. The ratio of volume of condensed heat transfer fluid required for safe operation to the volume displaced by the heat source tube would be therefore 4.12:1 (1897/461).

Preferably, the heat source tube is made from stainless steel. Preferably, the vessel is made from stainless steel. Preferably, the condenser vessel is made from stainless steel. This allows high durability and long service life.

Preferably, the degree of taper (i.e. the ratio of the inner tube diameters) of the heat source tube from its beginning to end is between 1.8:1 and 1.05:1, more preferably between 1.6:1 and 1.1:1, most preferably between 1.5:1 and 1.15:1.

Preferably, a fan, more preferably a centrifugal fan, is provided to force the heated gas along the heat source tube, to provide a forced draught arrangement. Optionally, two fans may be provided per evaporator, the fans being linked to respective fuel and air pre-mixers. The two fans and pre-mixers may be linked to a common burner, to allow two different air and fuel flows into the burner for different heating requirements. Thus the evaporator may be operated in a low fire stage and high fire stage. For example, the low fire stage might operate the evaporator at about 50% of its maximum heating capacity, and the high fire stage might operate at about 100% of its maximum capacity. This means that the heater can be more efficient by better matching energy input to energy needs and avoiding losses associated with cycling the evaporator on for heating, and then off when less heat is required. The two stage system is particularly suitable for larger evaporators e.g. at least 240 kW capacity.

By forcing the heated gas along the heat source tube using a fan, the heat source tube of the present invention can provide heat flux of 52-88 kW/m², whereas an atmospheric fire tube is known to have a heat flux of just 31-36 kW/m² (Source of comparison data: GPSA Engineering Data Book 2004). This allows a higher efficiency per unit of surface area, and a smaller system is required with a more compact design. A smaller mass of heat transfer fluid is required i.e. a lower heat transfer fluid fill level in the vessel is required. The smaller mass of heat transfer fluid means that the system is more responsive to changes in system heat transfer requirements.

The at least one heat transfer tube may comprise a plurality of heat transfer tubes, for example two or three. The at least one heat transfer tube and condenser vessel may be provided in a tube-and-sheet configuration, as would be known to one skilled in the art. The at least one heat transfer tube or condenser tube may have a single-pass configuration, or a return on U-bend configuration. The at least one heat transfer tube may have the same width as the condenser vessel through which it passes. Alternatively, the condenser vessel may have a manifold configuration with several inlets or outlets. This paragraph applies equally to the heat source tube (which may comprise more than one heat source tube) and to the evaporator vessel.

Preferably, the control system is configured to control the fan, pump or blower.

Preferably, the control system is configured to control the fan, pump or blower based on achieving a required temperature of the heat transfer fluid, preferably the evaporated heat transfer fluid.

Preferably, the control system is configured to control the fan, pump or blower based on achieving a required temperature of the first gas.

Preferably, the control system is configured to control the burner based on achieving a required temperature of the heat transfer fluid, preferably the evaporated heat transfer fluid.

Preferably, the control system is configured to control the burner based on achieving a required set point temperature of the first gas.

Preferably, the control system is configured to control the burner based on achieving a required temperature of the first gas.

Preferably, the required temperature of the heat transfer fluid is above the required temperature of the first gas.

Preferably, wherein the control system is configured to select control based on achieving a required temperature of the first gas instead of control based on achieving a required temperature of the heat transfer fluid.

Preferably, the system or heater comprises a controller or control system that comprises an on/off burner control (e.g., a thermostat) configured to achieve the required set point temperature of the first gas. This allows the unit to reach maximum efficiency each time it fires and efficiently controls how much energy goes into the system in a given cycle, thereby contributing to a high-efficiency system.

Preferably a temperature sensor is provided to measure the temperature of the first gas after it has passed through the vessel in the heat transfer tube or as the first gas finishes passing through the vessel in the heat transfer tube. Preferably, a temperature sensor is provided to measure the temperature of the first gas after it has passed through the vessel in the heat transfer tube and undergone pressure let-down. Preferably, a temperature sensor is provided to measure the temperature of the heat transfer fluid in the vessel or condenser vessel. Preferably, a temperature sensor is provided to measure the temperature of the evaporated heat transfer fluid in the vessel or condenser vessel. Preferably, the control system is configured to control the burner, or fan, pump or blower, based on the output of one or more of the temperature sensors.

Preferably, the vessel is a main vessel, the heater further comprising an isolation vessel connected to the main vessel, the isolation vessel being configured to receive and isolate heat transfer fluid from the main vessel.

Preferably, the heater comprises one or more sensors configured to measure pressure inside the main vessel, wherein the one or more sensors are provided on the isolation vessel.

Preferably, the isolation vessel is a stilling well.

Preferably, the isolation vessel comprises an outlet for heat transfer fluid, and a valve to control the flow of heat transfer fluid from the outlet, the outlet being open to the atmosphere.

In a second aspect of the present invention there is provided a heater suitable for heating a flow of natural gas, comprising two vessels, each vessel containing a heat transfer fluid; the heater further comprises two heat source tubes passing through a respective vessel and being at least partially immersed in the respective heat transfer fluid, the heat source tube being suppliable with heated gas to allow the gas to flow along the heat source tube to evaporate the respective heat transfer fluid and the heater further comprising at least one heat exchanger being connectable to a source of second fluid, the heat exchanger being arranged so that the second fluid can be heated by the evaporated respective heat transfer fluid.

The heat exchange system of the present invention, when considering all of its variants, has a range of benefits to offer.

A significant benefit of the present invention is that it provides an effective means to transport and deliver large amounts of energy over relatively small temperature differentials, while achieving high energy transfer using thermosyphon assisted convection.

The preferred design is to use the lowest number of cylindrical vessels and burners (e.g., three or fewer—preferably one, if not one, two, if not two, three) to minimize maintenance requirements and points of connection which might compromise vacuum. By being designed in such a manner, the customer has fewer burners to maintain, a smaller equipment footprint, and the ability to maintain vacuum under field conditions with fewer connection points.

The fan-driven burner exchanger used in at least one embodiment is extremely compact and has demonstrated efficiencies of up to 98%. The control of air fuel mixing results in ultra-low emissions. As the burner exchangers are compact, the resultant evaporator vessels are small.

Fluid required to immerse a compact, fan driven burner exchanger is a fraction of that required to immerse an equivalent atmospheric design. Minimizing the amount of fluid necessary results in a responsive system and reduces the amount of water and glycol needed, resulting in significant cost savings Incorporation of a fan supports the use of a single vessel (or limited number thereof) with a small burner exchanger and higher efficiency. Fewer points of connection and the use of vacuum appropriate connections limit opportunities for a loss of vacuum during long term operation. The design thereby contributes to a system that is easily maintainable, has a smaller equipment footprint, and has an ability to maintain vacuum under field conditions with fewer connection points.

Preferably, the system is 100% sealed from the outside environment and drawn on vacuum, which yields multiple benefits. For one, as a result of the system being under a sealed vacuum a lower operating temperature of 40-80° C. can be achieved (as opposed to atmospheric systems which require a boiling boiler temperatures >100° C.) which minimizes the difference in temperature between the heat exchange process and the outside air temperature, thereby minimizing energy which can be lost from the system and lowering fuel consumption. Yet further, as the system operates under vacuum whereby oxygen is not present, corrosion is mitigated thus promoting longer asset life through elimination or at least extensive mitigation of internal oxygen driven corrosion.

The compact system geometry, smaller thermal mass, provision of a control system, operation under sealed, vacuum conditions at lower temperatures (e.g., below 100° C.) and, using a minimum number of burners all act toward achieving high useful energy per unit of energy input, with the customer gaining an easily maintainable system that yields fuel savings and that takes up less space than other known natural gas line preheat systems.

In a third aspect of the present invention there is provided a natural gas conveyance system comprising a natural gas pipeline configured to have a flow of natural gas carried therein, the natural gas pipeline including an environmentally exposed section of pipeline; and a heat exchange system for the controlled heating of natural gas within at least a portion of the environmentally exposed section of pipeline, the heat exchange system being configured to input heat into the environmentally exposed section of the pipeline and, thus, into the flow of natural gas carried therein, the heat exchange system being configured such that the amount of heat generated thereby and thus input into the environmentally exposed section of pipeline is controlled based at least in part on a set point or baseline temperature of the natural gas in the environmentally exposed section of pipeline, the flow of the natural gas being subjected to heat input via the heat exchange system as needed to maintain the temperature thereof at or above the set point or baseline temperature.

The heat exchange system associated with the natural gas conveyance system may include a heating unit and/or an air/heat exchange fluid circulation unit. The heating unit may be in the form of a fuel burner or any other appropriate type of heating unit (e.g., a solar water/fluid heater). The air and/or heat exchange fluid circulation unit may include, for example, at least one of a fan, a pump, and a blower. A fluid circulation unit could be used to control the rate at which the heat exchange fluid is conveyed within the system and/or to increase the speed at which the heated air generated by the burner is conveyed. That is, aiding the circulation of either type of fluid in the heat exchanger system could improve the heat exchange efficiency and is thus considered contemplated hereby. In one variation, though, a pump for moving the heat transfer fluid may expressly not be provided, sufficient heat transfer fluid movement instead being generated by convection and/or gravity, as explained above in relation to at least one embodiment.

The heat exchange system associated with the natural gas conveyance system may include at least one thermal controller, which may include a thermostat and/or a digital processor. The thermal controller may be configured to control at least one of the circulation rate generated by the air circulation unit and the level of heat provided by the heating unit. The level of heat may, in one variation, be dictated by the heat content of the heated gas in the heat source tube, with the heated gas in the heat source tube being distinguished from the flow of the natural gas being heated by the heat exchange system.

The preferable features of the first and second aspects of the invention are equally applicable to the third aspect of the invention.

In a third aspect of the present invention there is provided a method of heating a gas, using the heater according to any of the first to third aspects.

The heater of the present invention is typically provided in a fully assembled condition to the customer. This provides the customer with increased speed of installation with fewer potential faults in the installation process.

Embodiments of the invention will now be described, purely by way of example, with reference to the drawings in which:

FIG. 5 is a schematic view of a second embodiment of the invention;

FIG. 6 is a front elevation view of the evaporator vessel of the first embodiment of the invention with the interior visible;

FIG. 7 is a side elevation view of the evaporator vessel of the first embodiment of the invention with the interior visible;

FIG. 8 is a plan view of the evaporator vessel of the first embodiment of the invention with the interior visible;

FIG. 9 is an isometric view of the evaporator vessel of the first embodiment of the invention with the interior hidden;

FIGS. 11 and 12 are isometric views of the modification of FIG. 2;

FIG. 16 is a side elevation view of another preferred configuration of the heat transfer tube that passes through the condenser vessel;

FIG. 17 is a plan view of the configuration of FIG. 16;

FIG. 18 is a front elevation view of the configuration of FIG. 16;

FIG. 19 is a cross-sectional view along line A-A of FIG. 16;

FIG. 20 is a cross-sectional view along line B-B of FIG. 16;

FIG. 21 is a side elevation view of the preferred configuration of the heat transfer tube of FIG. 15;

FIG. 22 is a plan view of the configuration of FIG. 21;

FIG. 23 is a front elevation view of the configuration of FIG. 21;

FIG. 24 is a cross-sectional view along line C-C of FIG. 21;

FIG. 25 is a front elevation view of a preferred configuration of the evaporator vessel with the interior visible;

FIG. 26 is a plan view of the evaporator vessel of FIG. 25;

FIG. 27 shows several schematic front elevation views of the evaporator vessel of FIG. 25 illustrating the volumes of various different elements;

In the following description of different embodiments of the invention the same reference signs refer to like parts.

Figure 1:
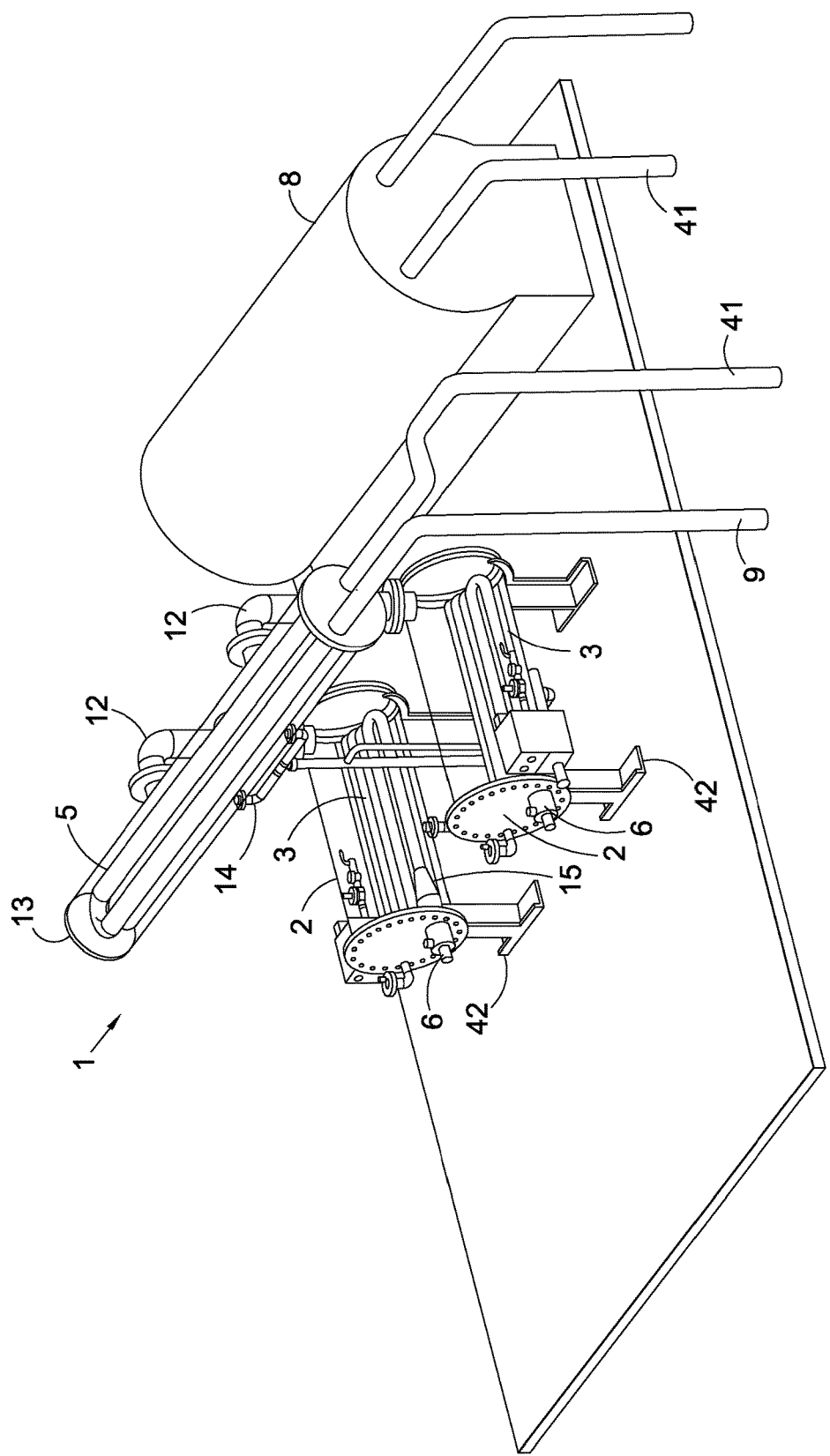
FIG. 1 is an isometric view of a heater according to a first embodiment of the invention.

According to the first embodiment of the invention and referring to FIG. 1, a heater 1 suitable for heating a flow of natural gas is provided, comprising an evaporator vessel or tank 2 containing a heat transfer fluid (not shown). In the embodiments shown in the drawings, two identical evaporator vessels 2 are provided. Two evaporator vessels allow one of the evaporator vessels 2 to be taken off-line, for example for maintenance, while the other evaporator vessel 2 still provides a portion (40%-100%) of peak heating demand. However, the following description refers to just one of the evaporator vessels 2, unless otherwise indicated. The heater 1 further comprises a heat source tube or pipe 3 passing through the vessel 2 and being immersed in the heat transfer fluid, with the heat source tube 3 being connectable to a source of heated gas to allow the heated gas to flow along the heat source tube 3 to evaporate the heat transfer fluid. The heater 1 further comprises a heat exchanger or heat exchanging element in the form of a heat transfer tube 5 or pipe being connected to a source of second fluid in the form of natural gas 9 to be heated, the heat transfer tube 5 being arranged to be heated by the evaporated heat transfer fluid.

The heat transfer tube 5 and, by extension, the flow of natural gas 9 to be heated is arranged to be heated by the evaporated heat transfer fluid. The heat transfer tube 5 may form part of the natural gas conveyance line or may surround a section of a natural gas conveyance line. If the latter, the heat transfer tube 5 could transfer heat to that section of line by any known means (e.g., convection, direct thermal transfer, radiation, etc.).

It is noted that, with particular reference to FIG. 34, the flow F of natural gas 9 enters the system at a first temperature T1, and where the temperature of the steam (evaporated heat transfer fluid) TS in the heat exchanger is below a desired set point the flow F of natural gas 9 will be heated via the heat exchanger. A thermal controller 31 may be used to limit the heat exchange provided to the flow F of natural gas 9 to a set point or baseline temperature TB. That heating is performed to a level, as dictated by the thermal controller 31, sufficient to heat the natural gas 9 to a second temperature T2, which is at or above the baseline temperature TB. It is, however, to be understood that the second temperature T2 can be higher than baseline temperature TB, as the natural gas 9 may not yet have undergone a pressure reduction. The second temperature T2 will drop after a reduction in pressure depending on the amount of the pressure drop. T2 may also be used in a secondary function as a temperature limit controller to prevent overheating of natural gas beyond setpoint which might damage equipment downstream of the heat exchanger unit H. Accordingly, the thermal controller 31 is configured to use the baseline temperature TB as a primary control factor and the second temperature T2 (due to its proximity to the heater it is less likely to be impacted by a change in gas flow rates) as a modifier for fine tuning and as a local safe operating limit. Should TB fail, the system will control off T2 and should both TB and T2 fail, the system will control off TS. Each site has a unique T2 based on the specific pressure drop at that location. The average temperature of the flow F of natural gas 9 will thus be at or above the baseline temperature TB by the time it exits the heat exchanger system disclosed herein or by another defined location is reached in the heat exchanger system. That is, the present system is designed to heat (i.e., increase the temperature) of the flow F of natural gas 9 as the situation warrants in order to maintain the temperature of the natural gas 9 at or above the baseline temperature TB.

In the present embodiment, temperature T1 is not measured and is not used to control the heating provided by the heater 1. This is because natural gas pipelines are typically located underground which means that the temperature of the natural gas in the pipeline is known to be within the range of 4-6° C. However, a temperature sensor may be provided to measure T1 and the measured temperature may be used to control the heating provided by the heater 1.

Figure 2:
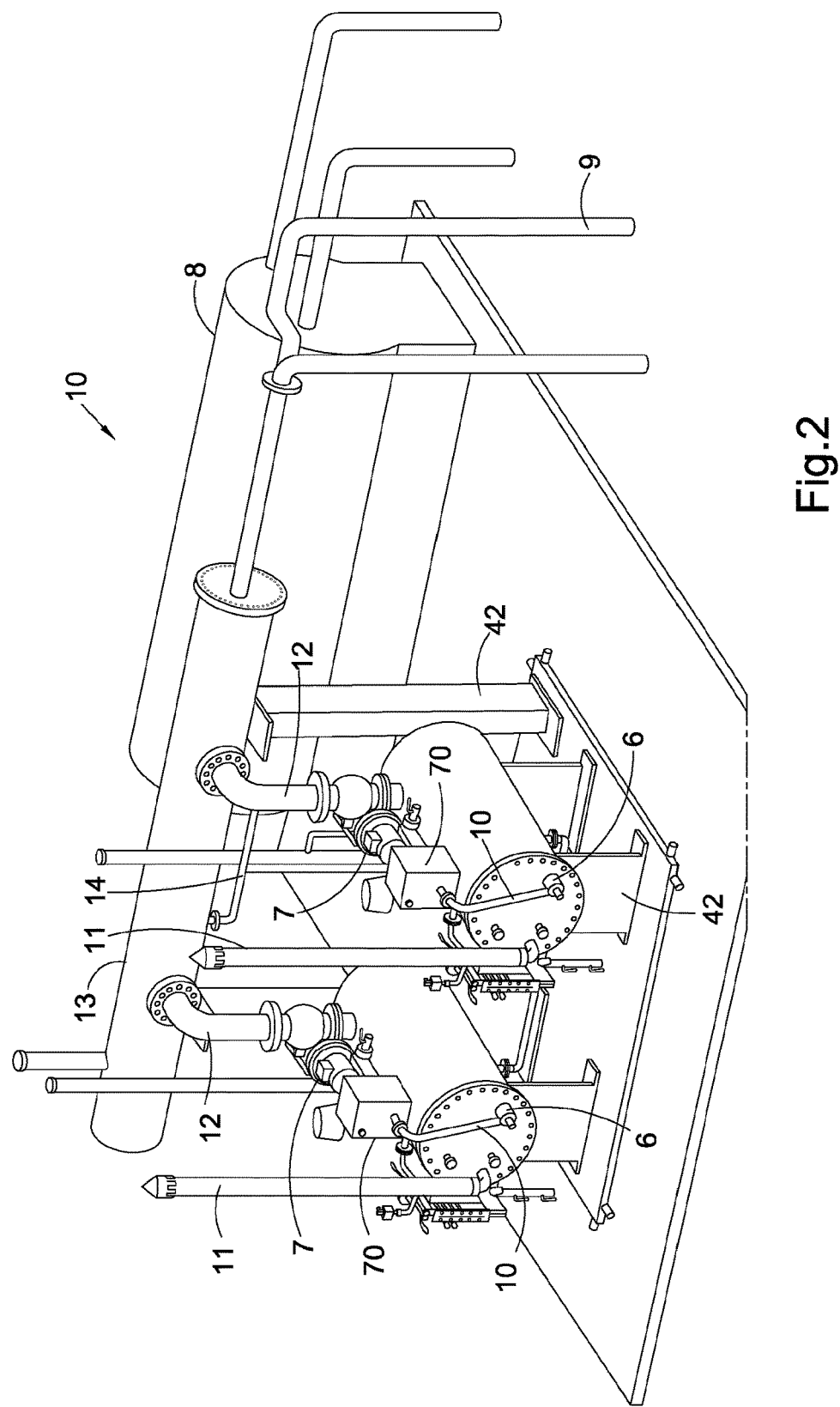
FIG. 2 is an isometric view of a modification of the first embodiment of the invention.
Figure 3:
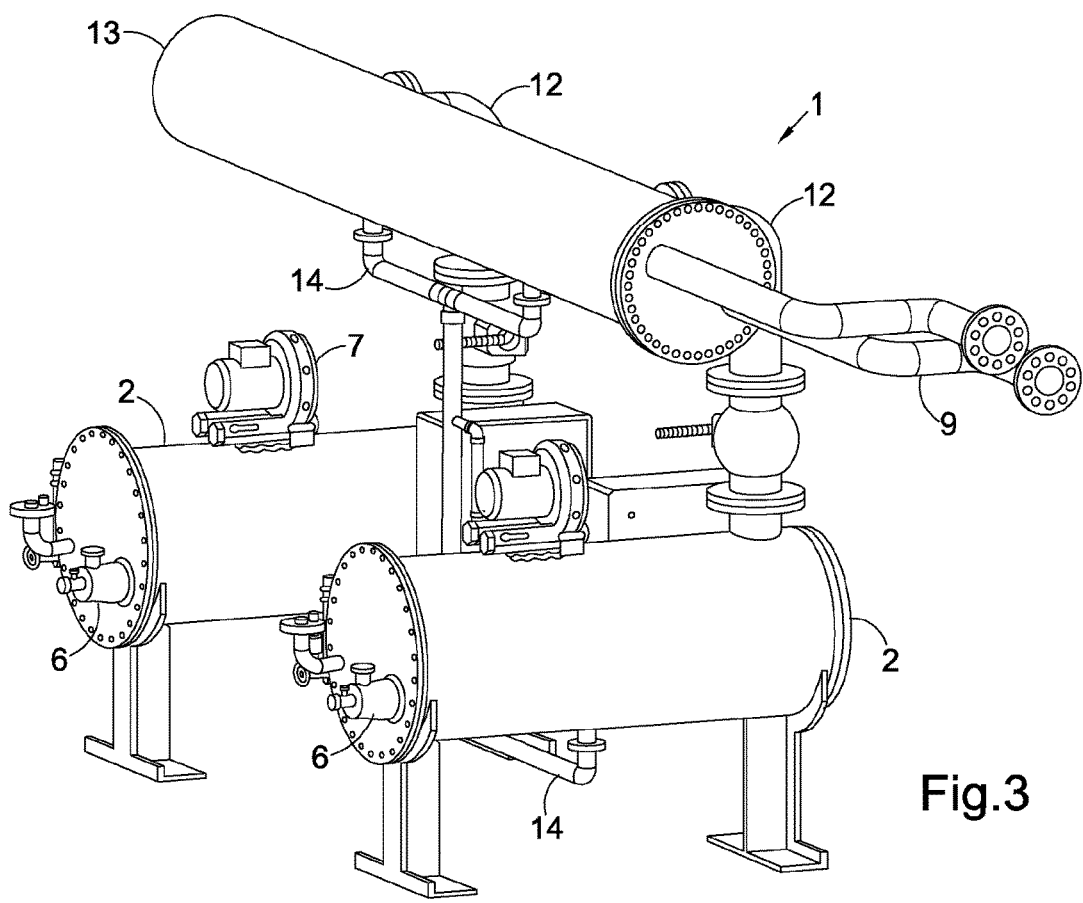
FIG. 3 is an isometric view of the first embodiment of the invention with the interiors of the evaporator and condenser vessels hidden.

FIG. 2 illustrates a modification of the embodiment of FIG. 1. Referring to FIGS. 1 and 2, in embodiments of the invention, the source of heated gas is a burner 6, but it is understood that any appropriate heating unit (e.g., a solar heating unit; convection unit; etc.) could be employed so long as a heated fluid flow could be generated thereby. Conveniently, the burner/heating unit has a blower or fan 7 or pump to force the heated gas along the heat source tube 3. The heated gas is the exhaust gas of the burner 6. The burner 6 uses at total pre-mixture of air and gas fuel. A fuel and air pre-mixer 70 is provided for this between the fan 7 and the burner 6, and is connected to the burner by burner tube 10. The burner 6 advantageously may use a highly homogenous flame, and the fan 7 is used to give high speed flow of the heated gas in the heat source tube 3, thereby ensuring high levels of heat transfer efficiency and combustion and a reduced noise level.

The burner 6 and the heat source tube 3 can be suitably obtained from Lacaze Energies.

An optional tank 8, which acts as a water bath heater, is connected to the condenser vessel or tank 13 by tube 41. The tube 41 has valves (shown in FIG. 11) to control flow of the heated natural gas from the condenser vessel 13 to the tank 8. The tank 8 can be used as a supplementary heater for the natural gas. However, the tank 8 is not required for the invention to function.

Figure 4:
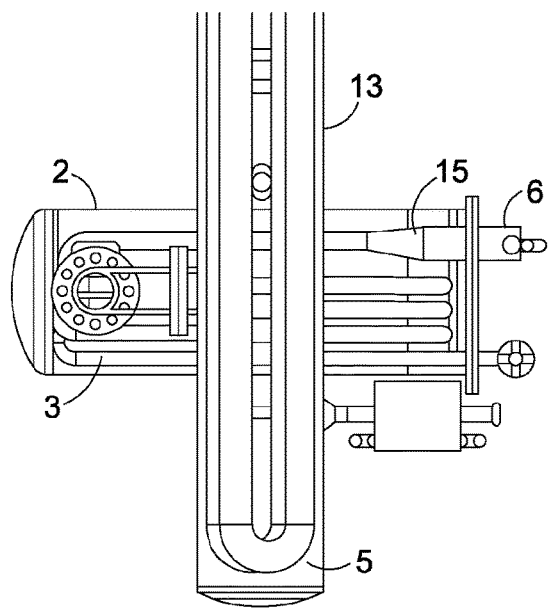
FIG. 4 is a part plan view of the embodiment of FIG. 1.

The fuel pre-mixture passes through the burner tube 10 to the burner 6 and into the evaporator vessel 2. FIGS. 1 and 2 show the burner head, which is the part of the burner 6 on the outside of the evaporator vessel 2. The burner head is attached to a flange forming one end of the evaporator vessel 2. The flame originates in the burner head. FIG. 4 shows a cone-shaped first section 15 of the heat source tube 3. The flame is housed in the hollow cone-shaped section 15. The cone-shaped section 15 has a relatively greater wall thickness than rest of the heat source tube 3 to provide a greater temperature difference between the inside and outside of the heat source tube 3 at the cone-shaped section 15. The inside temperature at the cone-shaped section 15 can reach 1700° C. The heated gas continues through the heat source tube 3 and transfers heat to the heat transfer fluid outside the heat source tube 3 in the evaporator vessel 2. The heated gas then comes to the end of the heat source tube 3 where it leaves the vessel 2. The gas then passes up the flue 11, at the top of which it is exhausted to the atmosphere.

As the heated gas passes along the heat source tube 3 heat is transferred from the heated gas flow inside the heat source tube 3 to the heat transfer fluid outside the heat source tube 3 through the walls of the heat source tube 3. The flow rate of the heated gas and surface area of the heat source tube 3 are such that the heat transfer from heated gas flow causes the heat transfer fluid to evaporate. The heat transfer fluid then rises in the vessel 2 due to natural convection (i.e. the change in relative density of the vapour) and passes out of the vessel 2 into the riser or steam pipework 12. The riser 12 connects the evaporator vessel 2 and the condenser vessel 13. The heat transfer fluid vapour then passes into the condenser vessel 13. In this embodiment, the condenser vessel 13 has a similar construction to the evaporator vessel 2. In other embodiments, the heat transfer tube 5 (or vessel) may take the form of the condenser vessel 13 and the condenser vessel 13 (or tube) may take the form of the heat transfer tube 5. In embodiments, the at least one heat transfer tube may be a plurality e.g. two or three tubes. In the present embodiment, the heat transfer tube 5 has a U-bend configuration, but it may have a single-pass configuration.

Both the interiors of the evaporator vessel 2 and the condenser vessel 13 not occupied respectively by the heat source tube 3 and heat transfer tube 5 are preferably closed to the atmosphere. This provides a closed-loop system and allows the heat transfer fluid to be circulated and reused. This also allows a reduced atmospheric pressure to be used inside the vessels 2, 13. It is, of course, to be understood that the flow F of the natural gas 9 through the natural gas pipeline P is essentially kept independent of the interiors of the evaporator vessel 2 and the condenser vessel 13. That said, the system may be provided with a bleeder or off-take valve (not shown) placed on the low-pressure section of the main gas pipeline P (post-pressure drop, where the baseline temperature TB exists) to provide an amount of natural gas 9 as a source of fuel to a given burner 6 (i.e., even if natural gas 9 is used to fuel a burner, any unspent/unburned amount of the natural gas 9 would not reach the evaporator vessel 2 and/or the condenser vessel 13, as the burner and its related flue are separately contained relative to the rest of the system). That is, the burner system is expressly designed to indirectly heat the flow F of the natural gas 9.

Inside the condenser vessel 13 the hot heat transfer fluid vapour encounters the cold heat transfer tube 5 containing a flow of natural gas to be heated. The heat transfer fluid condenses on the outer surface of the heat transfer tube 5, thereby transferring its latent and sensible heat to the flow F of natural gas 9 and thereby heating the natural gas 9. The condensed heat transfer fluid passes to the bottom of the condenser vessel 13 by gravity. A downcomer pipe 14 is connected to the bottom of the condenser vessel 13. The downcomer pipe 14 connects the condenser vessel to the evaporator vessel 2. The condensed heat transfer fluid then passes down the downcomer pipe 14 and back to the evaporator vessel 2.

The natural gas to be heated typically enters the heat transfer tube 5 in condenser vessel 13 at 4 to 6° C., and the temperature of the natural gas is typically raised by 8 to 30° C. by the heat from the heat transfer fluid. Monitoring of the temperature takes place at the heater outlet or, alternatively, after pressure let-down, via the use of one or more control systems 31 (e.g., thermostats, another known thermo-controllers, or a broader based controller (e.g., a PLC or PC), which may incorporate a thermostat or other thermo-controller, among other control and/or display capabilities). The control systems 31 regulate the input of heat into the flow F of the natural gas 9, so the natural gas 9 can be kept, on average, at or above a desired set point or baseline temperature TB. In one variation, the temperature of the flow F will likely follow a sinusoidal gradient. In particular, the natural gas 9, under such a scenario, would be heated for a time to bring it some amount (e.g., TB+0.5° C.~1.0° C., or some other predefined temperature) above the setpoint TB and the heater then turning off for a period until a defined temperature at or below (e.g., TB−0.5° C.~1.0° C., or some other predefined temperature) the setpoint TB is reached, with the heater 1 again being activated so as to bring, once again the temperature of the flow F above the setpoint TB. The thermo-contoller may be, e.g., a simple on-off switch on a heating unit or may be more complex. For example, a control system 31 could control the amount heat input into the system (e.g., via control of the steam operating temperature or pressure) and/or the circulation rate of the heat exchange fluids involved. It is to be understood that the control system 31 could include various combinations of elements, including a simple on/off thermostat for controlling the burning of fuel and one or more mechanisms for controlling system pressure and/or fluid flow rates. Any such various combinations are considered to be within the scope of operation of a given present control system 31.

The control system (e.g., a digital controller) 31 may further provide the ability to collect, manipulate, receive, and/or display data and/or command signals. With those parameters in mind, the control system 31 can provide a wide degree of functions, used separately or in combination with one another. The digital controller 31 can be used capture sensor data such as pipeline flow, pressure and gas temperature (TB, T2) as well as system parameters including pressure, steam temperature (TS), fluid temperature, exhaust temperature and alarms (low fuel gas, high fuel gas, loss of flame, fan deactivation, failure to ignite, low fluid level, high system pressure, high steam temperature, high exhaust temperature, high fluid temperature, high burner head temperature). The digital controller 31 can be used to adjust operating parameters such as steam temperature (TS), pressure and total energy in the system (e.g., controlling the temperature and/or heat input via the on/off control thermostat). The digital controller 31 can be used to monitor safety systems, trip alarms, system health, provide maintenance alert and system performance. The digital controller 31 can be used to start the system automatically after a power interruption. The digital controller 31 can be used to remotely bring the heater in and out of service. It is to be understood that any or all of these functions could be provided within a given digital controller 31, depending on the desires of a given customer.

As described above, the heat transfer fluid is able to move in a circuit creating a two-phase thermosyphon. The natural convection upflow and return flow by gravity mean that no pump is required to move the heat transfer fluid between the evaporator and condenser vessels 2, 13. The condenser vessel 13 is provided above the evaporator vessel 2 to allow this effect.

In this embodiment, the heat transfer fluid is a mixture of water and non-toxic ethylene glycol. An absolute pressure of 50 mbar is used inside the evaporator vessel 2 and condenser vessel 13. The initial boiling point of water is below 40° C. at this pressure. The glycol acts to store heat as the water boils off because the glycol has a much higher boiling point than the water. However, the glycol is primarily used as an antifreeze in the current system. Also, it is a goal to use the minimum amount of glycol necessary to achieve its desired purpose, as glycol acts as an insulator and thereby inhibits the heat exchange process.

Figure 37:
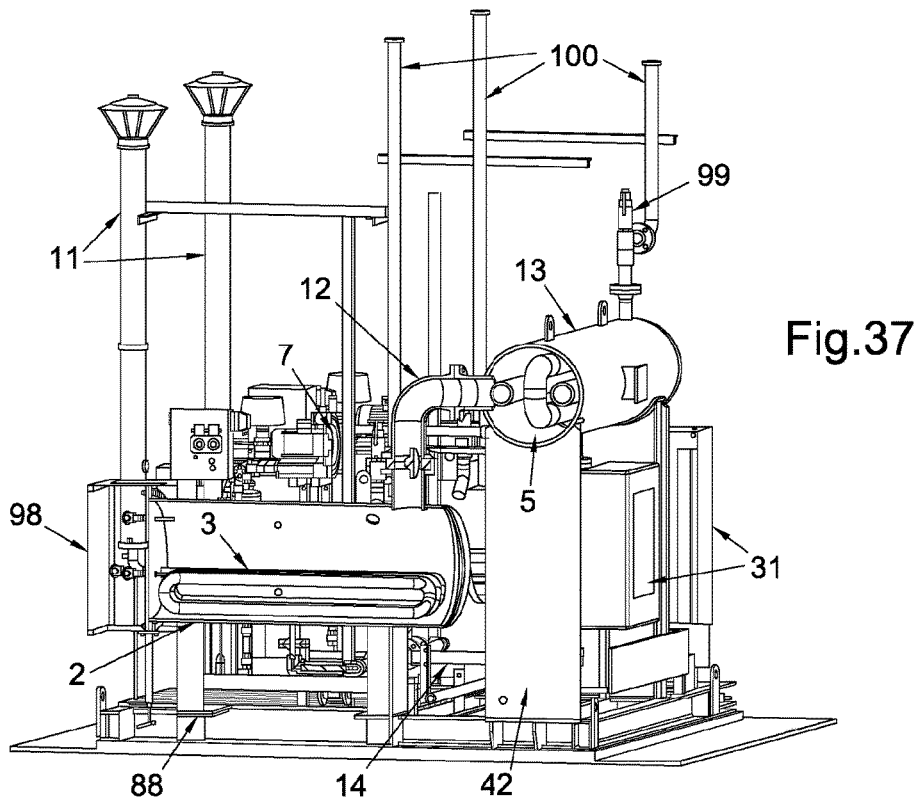
FIG. 37 is an isometric cross-sectional view of a heater according to a fifth embodiment of the invention.

The evaporator vessel 2 is cylindrical and it is arranged so that its longitudinal axis is horizontal. The evaporator vessel 2 is raised above the ground on steel legs 42, one at each end of the vessel 2. A galvanised steel or painted carbon steel skid may be provided as a base for the legs 42. The skid may be integrated into a support frame 88, typically made of steel, as shown in FIG. 37. The heat source tube 3 inside the evaporator vessel 2 is made up of several straight sections of tube. The straight sections are slightly shorter than the length of the evaporator vessel 2. The straight sections are joined by curved sections which turn the heat source tube 3 back on itself. The straight sections are arranged substantially horizontally. Thus the minimum volume of heat transfer fluid liquid needs to be provided to immerse the heat source tube 3 fully.

In the first embodiment, the heat source tube 3 after the cone-shaped section 15 is tapered in the direction of flow of the heated gas. This acts to increase the velocity of the heated gas flow.

The ratio of the internal diameter of the beginning of the heat source tube 3, i.e. the diameter of the heat source tube 3 immediately after cone-shaped section 15, to the internal diameter of the end of the heat source tube 3, i.e. the diameter of the heat source tube 3 immediately before the flue 11, is preferably between 1.8:1 and 1.05:1, more preferably between 1.6:1 and 1.1:1, most preferably between 1.5:1 and 1.15:1. These ratios indicate the degree of taper of the heat source tube from its beginning to end.

Depending on the required power output, the total number of straight tube sections in the evaporator is between 8 and 20.

Desirably, the volume of heat transfer fluid in liquid form is kept to a minimum to avoid excessive thermal inertia. This improves system response time to changing process requirements and reduces heat losses to the atmosphere. However, the minimum level of the liquid heat transfer fluid is kept a small distance, say a tenth of the diameter of the evaporator vessel 2, above the top of the heat source tube 3. This ensures that sufficient liquid heat transfer fluid is provided in the vessel 2 to avoid the heat source tube 3 becoming exposed once some of the heat transfer fluid has evaporated. Preferably, the tops of a plurality of straight sections of the heat source tube 3 are provided at the same level. This is shown in FIG. 6. As also shown in FIG. 6, the distance between heat transfer fluid level and the tops of the straight sections of the heat source tube 3 is 56 mm, but the minimum distance may be as low as 50 mm.

Similarly to the evaporator vessel 2, the condenser vessel 13 is cylindrical and it is arranged so that its longitudinal axis is horizontal. The condenser vessel 13 is raised above the ground on steel legs 42. The heat transfer tube 5 inside the condenser vessel 13 is made up of several straight sections of tube. The straight sections are slightly shorter than the length of the condenser vessel 13. The straight sections are joined by curved sections which turn the heat transfer tube 5 back on itself. The straight sections are arranged substantially horizontally.

Figure 36:
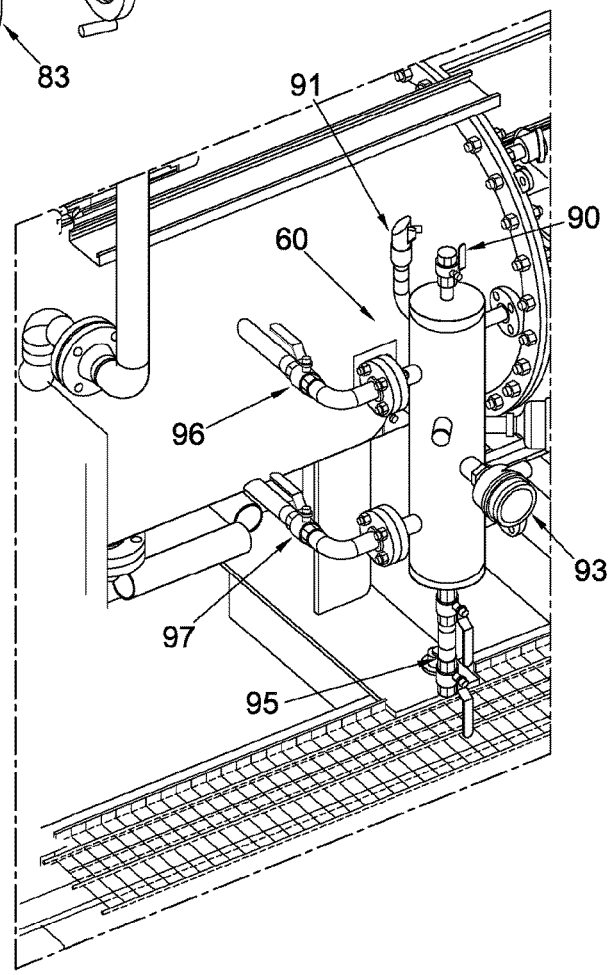
FIG. 36 is a detailed view of a stilling well.

A stilling well or isolation vessel 60 (shown clearly in FIGS. 32 and 36) may be used to equalise pressure between the top and bottom evaporator vessel 2 and to facilitate fluid level sensing with minimal turbulence. A preferred design of the stilling well 60 may include isolation valves 96, 97 (of which two such valves are shown) to provide ease of access to and maintenance of measuring devices within the process envelope, which may from time to time require service. This configuration locates almost all the service items located within the sub-atmospheric section of the process in such a way that they are in a small, easily accessed "service zone" located on the stilling well. As such, so if one of the monitoring instruments located on the stilling well 60 should fail, service work would result in the minimum of disturbance within the process envelope, thus maximizing the time the system is online and minimizing potential for compromise to the integrity of the sub-atmospheric operating envelope. The temperature probes located in the steam flow, exhaust and in the glycol are also separately jacketed.

This arrangement allows a fluid sample to be obtained from the double block and bleed valves 95 on the base of the stilling well 60, at sub-atmospheric or atmospheric conditions, without taking the heater 1 offline. The isolation valves 96, 97 allow the stilling well 60 and "service zone" to be isolated from the rest of the system which allows the system to remain below atmospheric pressure while the "service zone" is brought up to atmospheric or above atmospheric pressure.

In a preferred embodiment, the stilling well 60 comprises one or more of the following: a maintenance valve 90 for raising or lowering pressure in the stilling well 60; a pressure sensor/switch 91 for sensing pressure; two level sensors 93, 94 for sensing the level of heat transfer fluid in the evaporator vessel 2; a fluid level sight glass 92 to allow the fluid level in the stilling well 60 and evaporator vessel 2 to which the stilling well 60 is attached and the rest of the system to be ascertained; a double block and bleed valve with integrated sampling tube 95 is located on the lowest section of the stilling well 60, and used for fluid sampling e.g. to check glycol quality and condition levels, as well as for adding or removing fluid from the stilling well 60. However, it should be appreciated that a single level sensor 93, 94 or single valve for fluid sampling may be provided.

Once the fluid sampling or repair of monitoring instruments on the stilling well 60 has been completed, the maintenance valve 90 is used to raise or lower the pressure in the stilling well 60. A "soap bubble test" preformed on positive pressure can be employed to ensure a proper seal has been established on any items maintained on the stilling well 60. The maintenance valve 90 can then be used to lower the pressure in the stilling well 60 to below atmospheric pressure.

In a preferred embodiment, one or more of the condenser vessel 13, evaporator vessel 2, riser 12, downcomer 14, and stilling well 60 is provided with insulation, typically with an outer layer of insulating material, to prevent thermal losses.

In the first embodiment, the centre in the longitudinal direction of the evaporator vessel 2 is positioned under the centre in the width direction of the condenser vessel 13. The longitudinal axis of the evaporator vessel 2 is perpendicular to the longitudinal axis of the condenser vessel 13 although both axes are horizontal. This is shown most clearly in FIG. 4. Alternatively, the longitudinal axis of the evaporator vessel 2 may be parallel to the longitudinal axis of the condenser vessel 13, as shown in FIGS. 28-33. Also, the centre in the longitudinal direction of the evaporator vessel 2 may be positioned at the same vertical level as the centre in the width direction of the condenser vessel 13.

The modification shown in FIG. 2 differs from the embodiment shown in FIG. 1 in that the evaporator vessel 2 is positioned further under the condenser vessel 13. In particular, in the modification shown in FIG. 2 the centre in the longitudinal direction of the evaporator vessel 2 is not positioned under the centre in the width direction of the condenser vessel 13. Instead, only the end of the evaporator vessel 2 is positioned under the condenser vessel 13. In addition, the risers 12 are on the same side of the condenser vessel 13 as the burner 6 and the end of the evaporator vessel 2 in which heated gas enters the evaporator vessel 2. Conversely, in the first embodiment, the risers 12 are on the opposite side of the condenser vessel 13 to the burner 6 and the end of the evaporator vessel 2 in which heated gas enters the evaporator vessel 2.

FIG. 5 shows a schematic view of the path of the heat transfer fluid between the evaporator vessel 2 and the condenser vessel 13. For simplicity, the condenser vessel 13 is shown in the same orientation as the evaporator vessel 2. Starting with the evaporator vessel 2, the sectioned heat source tube 3 contains heated gas 20. In this embodiment, the liquid heat transfer fluid 21 fully immerses the heat source tube 3. A liquid-vapour separator 22 prevents liquid heat transfer fluid 21 from passing out of the evaporator vessel 2 up the riser 12. The path of the vapour heat transfer fluid up the riser 12 is shown as an arrow. In the condenser vessel 13 the sectioned heat transfer tube 5 contains natural gas 23. Detail of a sectioned part of the heat transfer tube 5 is shown separately. The internal surface 24 and external surface 25 of the tube 5 are shown. The condensed liquid heat transfer fluid 21 is shown in the downcomer pipe or condensate return pipe 14. In another embodiment, evaporator vessels 2 are provided on both sides of the evaporator vessel 2 shown in FIG. 2, with common downcomer pipes 14.

Figure 10:
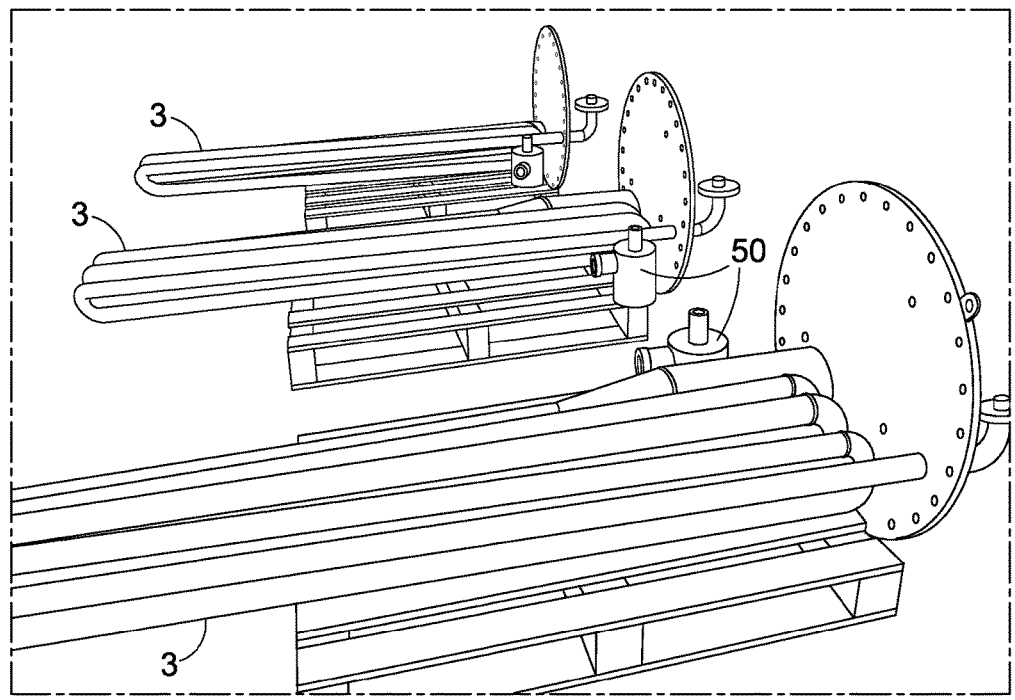
FIG. 10 is a perspective view of evaporator vessels during production before the walls of the vessels have been fitted.

FIGS. 6-10 show internal details of the evaporator vessel 2. The overlapping straight sections of heat source tube 3 are shown most clearly in FIGS. 6, 8 and 10. The heat source tube 3 has a compact design with the tube length and diameter corresponding to the optimal surface area to ensure near complete energy transfer. FIG. 10 shows burners 6 separated from the flanges forming respective one ends of the evaporator vessels 2.

Figure 12:
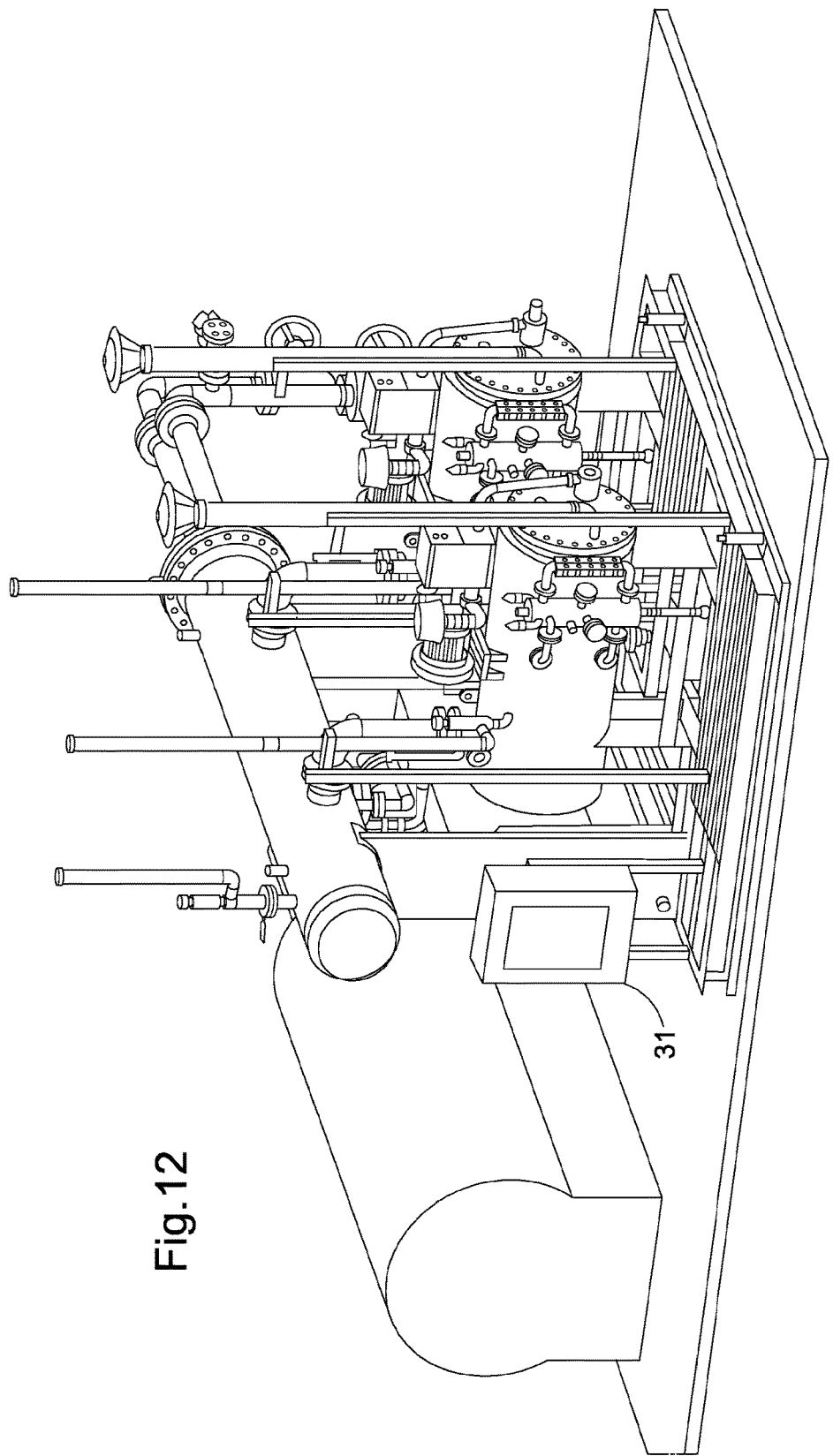

FIGS. 11 and 12 show additional views of the modification shown in FIG. 2 containing additional detail. A fuel supply line 30 to the burner 6 is shown in FIG. 11. Also shown are the control systems 31 for the burner 6 and fan 7. The circulation rate of heated gas in the heat source tube 3 is determined by the control systems 31 based on the heat flux rates and evaporator geometry.

Figure 13:
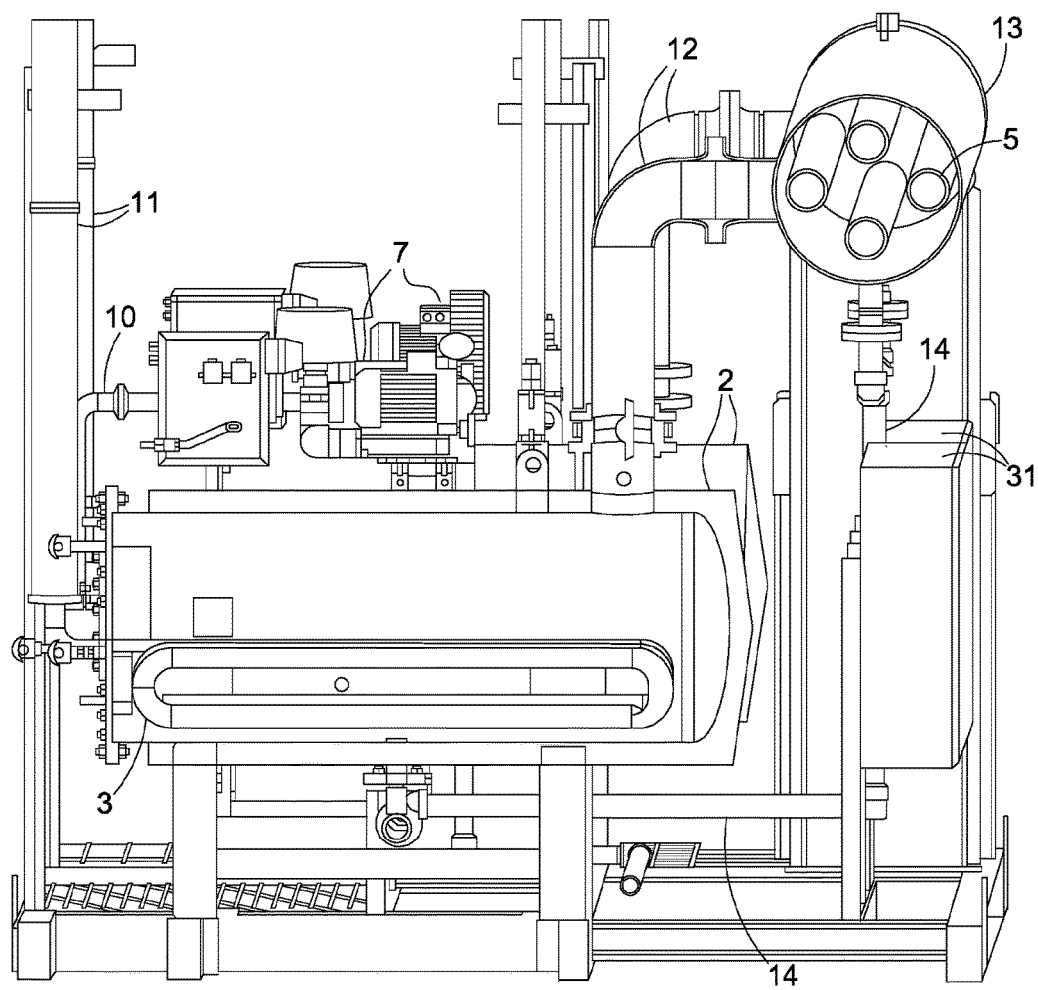
FIGS. 13 and 14 are cross-sectional views of the modification of FIG. 2.
Figure 14:
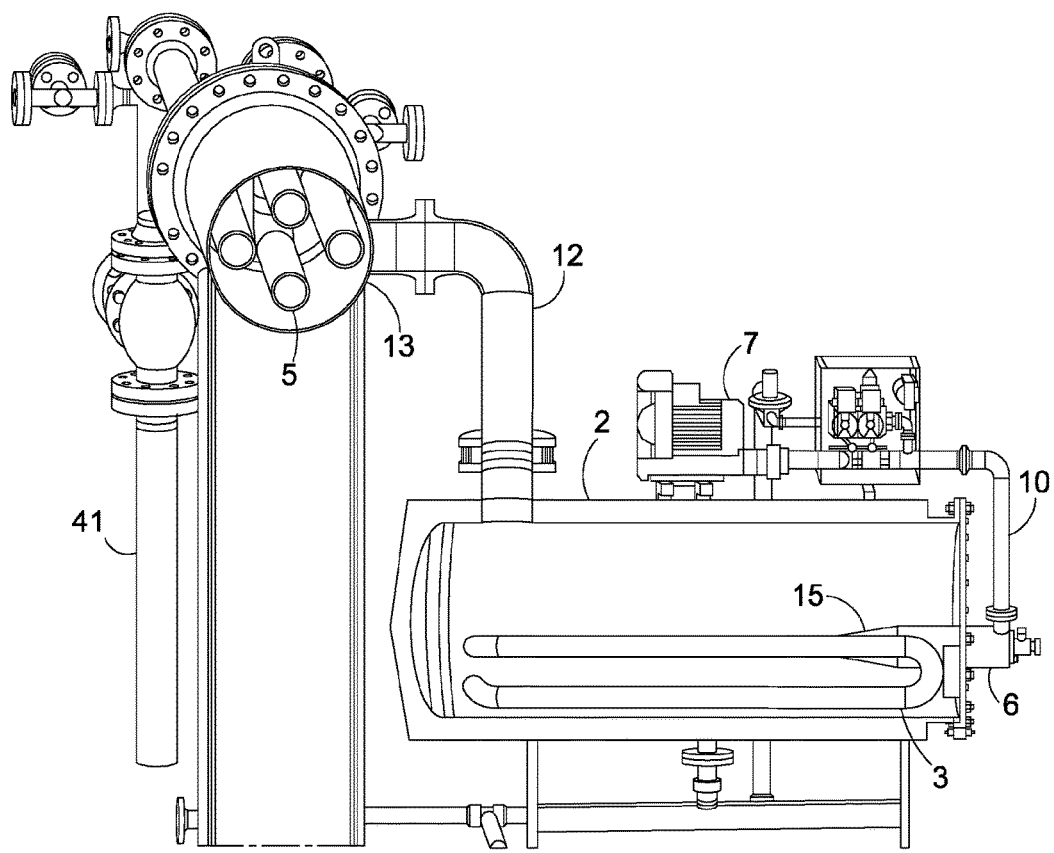
Figure 28:
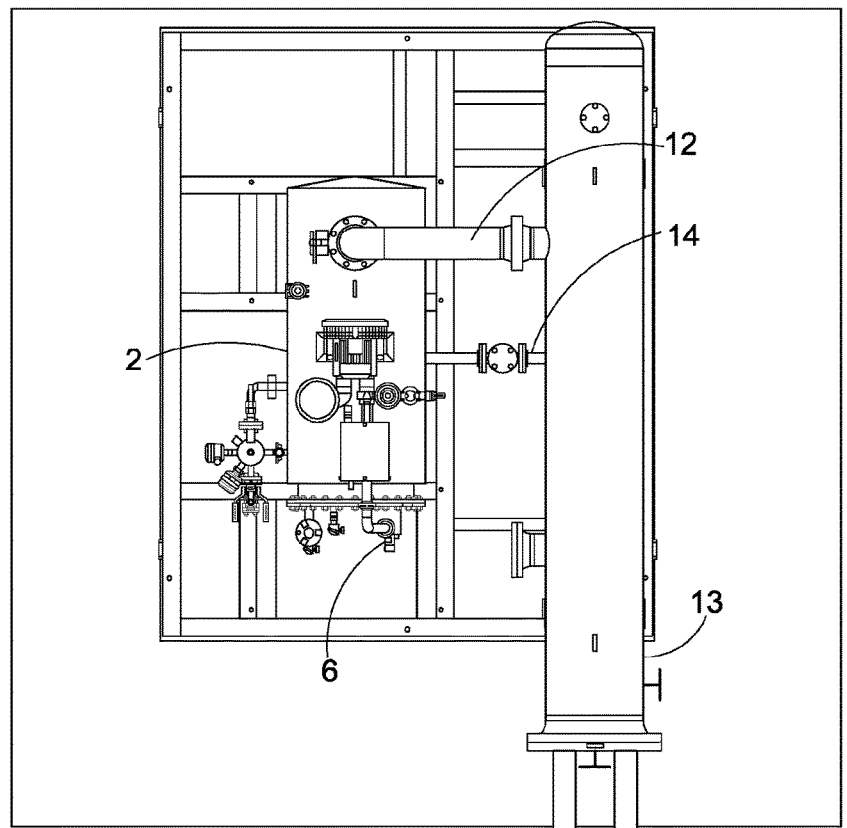
FIG. 28 is a plan view of a heater according to a third embodiment of the invention.
Figure 29:
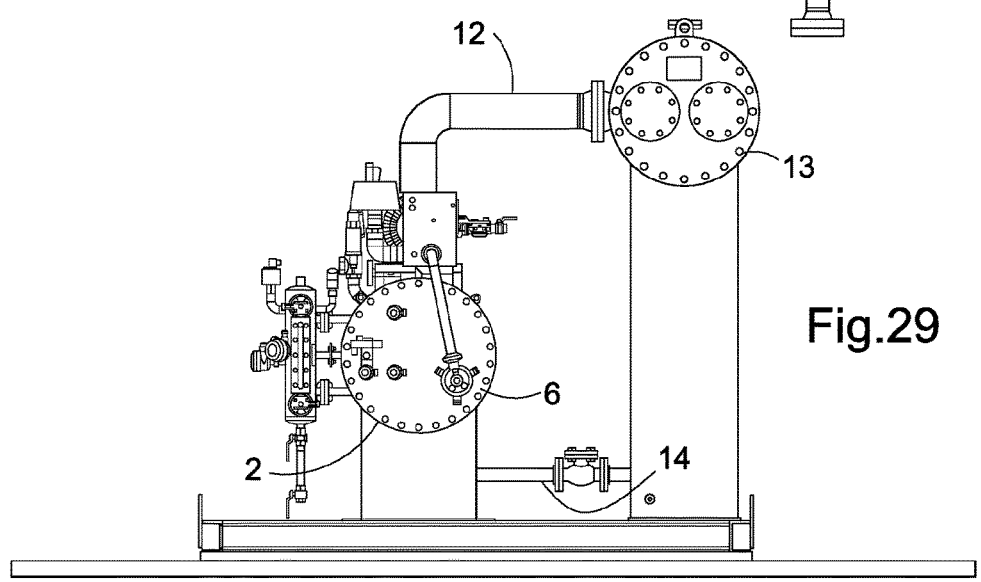
FIG. 29 is a front elevation view of the embodiment of FIG. 28.
Figure 30:
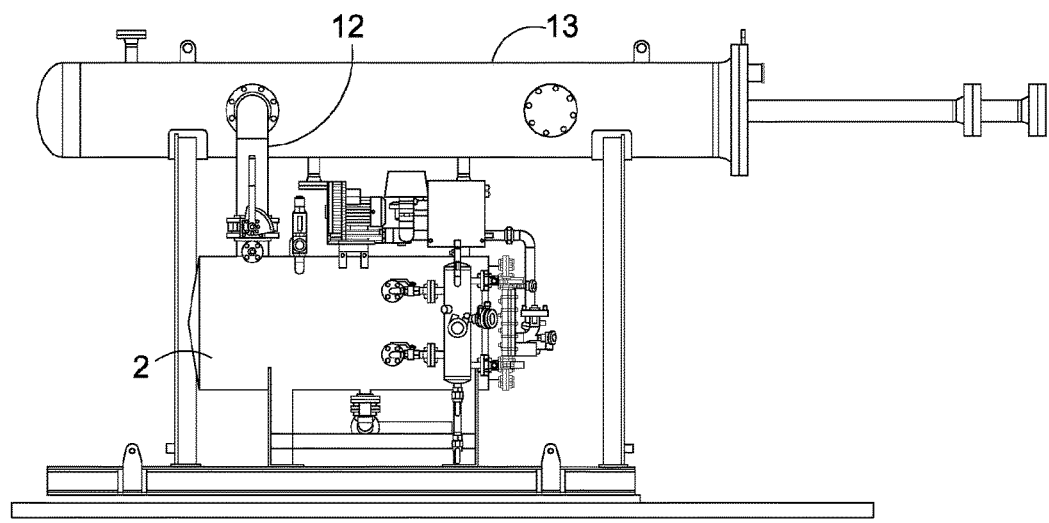
FIG. 30 is side elevation view of the embodiment of FIG. 28.
Figure 31:
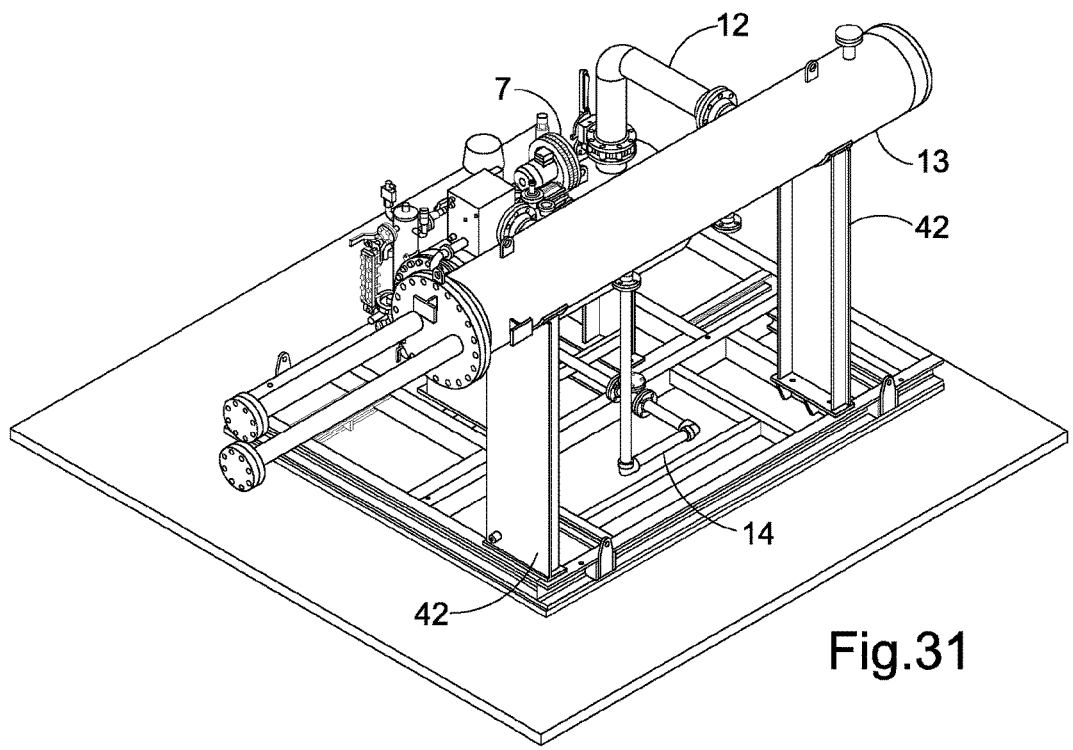
FIG. 31 is an isometric view of the embodiment of FIG. 28.

FIGS. 13 and 14 show opposing cross-sectional views taken through one of the evaporator vessels 2 of FIG. 12.

Figure 15:
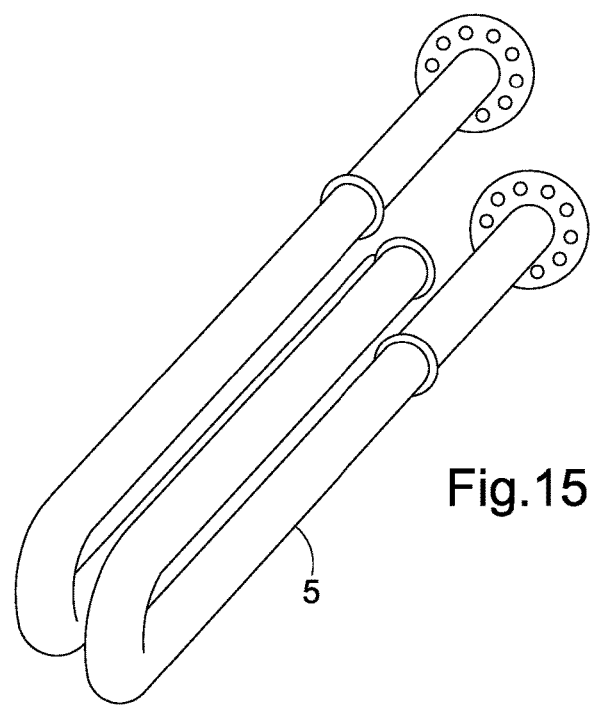
FIG. 15 is an isometric view of a preferred configuration of the heat transfer tube that passes through the condenser vessel.

FIG. 15 shows a preferred shape of the heat transfer tube 5 of the condenser vessel 13 with the condenser vessel 13 hidden. The heat transfer tube 5 has four straight sections joined by three curved sections. The straight sections are disposed at the vertices of a notional parallelogram in cross-section. The sinuous path allows a large length of heat transfer tube 5 to be contained within the condenser vessel. Hence a large external surface of the heat transfer tube 5 is exposed, thereby allowing a large transfer of heat. The heat transfer tube 5 inner diameter is 4 inches (approximately 10 cm). The configuration of FIG. 15 is also shown in FIGS. 13-14 and 32-33.

The objective of the control systems 31 is to maintain the flow F of natural gas 9 at a constant temperature of 0° C. or above after pressure let-down of the natural gas 9. Monitoring of the temperature takes place at the heater outlet or, alternatively, after pressure let-down, via the use of one or more control systems 31 (e.g., thermostats or other known thermo-controllers). If the natural gas outlet temperature is not within an acceptable tolerance of a setpoint TB (e.g., within 0.5° C.~1.0° C.) of a set point, the burner 6 or other heating mechanism (e.g., solar heater) being employed will be fired to achieve heating until the required set point is achieved. The control systems 31 regulate the firing of the burner 6 or other heat input by a simple on/off based on the temperature registered by the thermal controller TC, by maintaining a desired heated fluid flow, or by another means commonly employed when using heat exchanger systems, in order generate a desired temperature within a fluid being heated thereby. A key point of the present system is that the system facilitates the controlled heating of the flow F of the natural gas 9, as needed, to maintain the temperature thereof at or above its set point. As it is only necessary to maintain the temperature of the natural gas 9 at least at its set point, it is optimal to avoid overheating the natural gas beyond the set point TB, as that is essentially just wasted energy. While the system design itself cannot mitigate all overheat scenarios such as a sudden drop in flow on the pipeline, it is an operational goal of the present system to maintain the gas at average temperature of the setpoint TB.

FIGS. 16-20 show an alternative configuration of the heat transfer tube 5 that passes through the condenser vessel 13 to that shown in FIG. 15. FIGS. 16-20 are more detailed than FIG. 15. The heat transfer tube 5 has six straight sections joined by five curved sections. The straight sections are disposed at the vertices of a notional hexagon in cross-section. A condenser flange plate 61 is shown that forms one end of the condenser vessel 13. Flanges 64 are provided at the ends of tubes that pass through the condenser flange plate 61. Having passed through the condenser flange plate 61, the tubes form the heat transfer tube 5. The straight sections of the heat transfer tube 5 are spaced apart by a guide plate 63, which has spaced holes and notches through which the straight sections of heat transfer tube 5 pass. The configuration of the heat transfer tube 5 is clearly shown in FIG. 20.

In one variation, it is possible to extend the connection flanges 64 to the pipeline P away from a steam side flange to reduce the impact of a resulting hazardous zone on the positioning of non-hazardous rated devices (e.g., the control panel, sensing devices and other combustion and electrical equipment) on the equipment. This is because depending on the operating pressure of the gas coil, a resulting hazardous area of up to several meters is formed where all equipment within that area must be certified for use in a hazardous area. This layout is not unique to the present design, but does explain why the connection pipes protrude from the equipment package in the manner illustrated.

FIGS. 21-24 show a more detailed view of the heat transfer tube 5 that passes through the condenser vessel 13 of FIG. 15.

FIGS. 25-27 show an alternative configuration of the evaporator vessel to that shown in FIGS. 6-9.

FIGS. 28-31 show a side-by-side arrangement of a single evaporator vessel 2 and the condenser vessel 13. The evaporator vessel 2 shown is rated at 120 kW. The heat source tube 3 inner diameter is 4 inches (approximately 10 cm).

Figure 32:
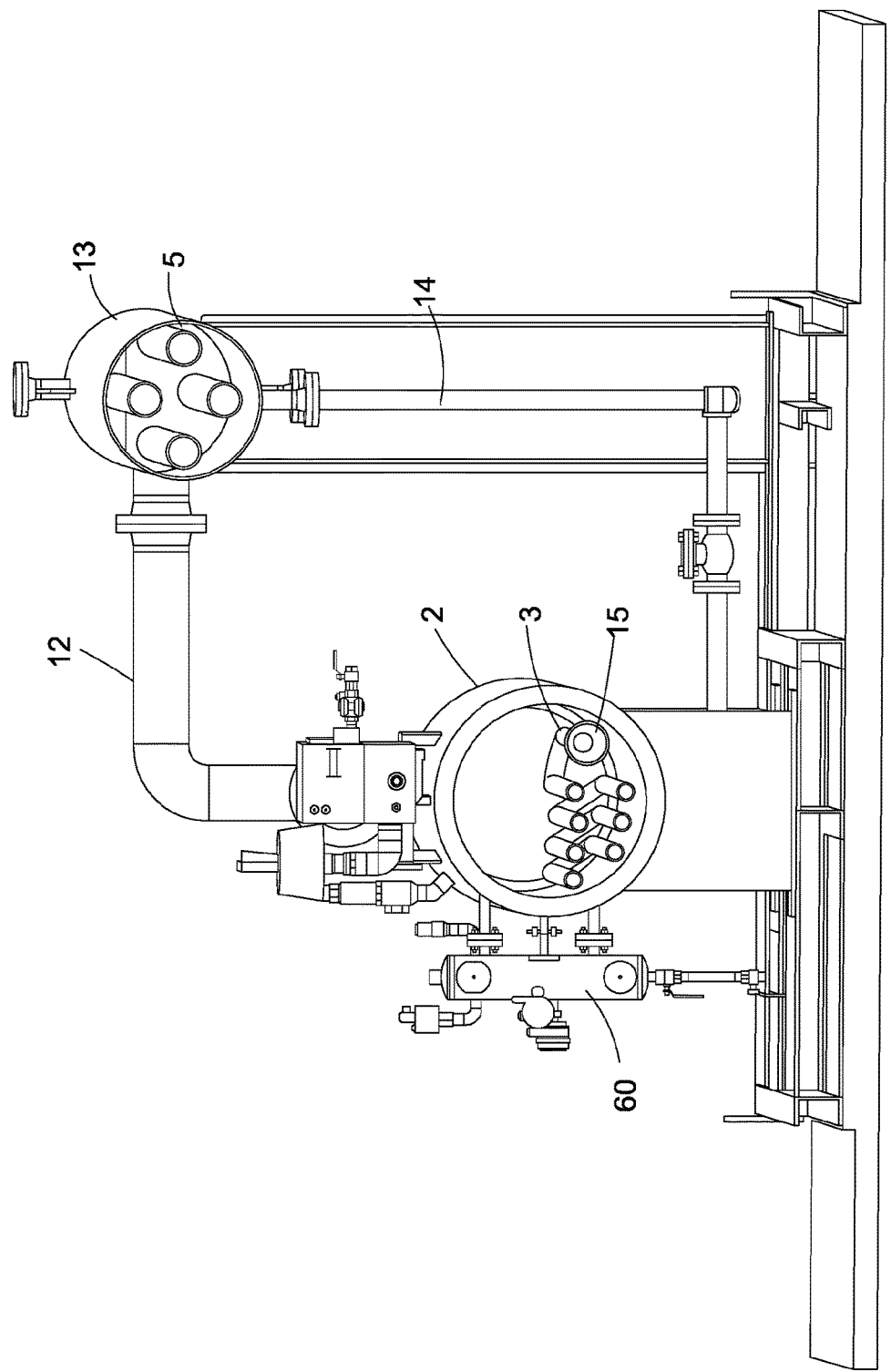
FIGS. 32 and 33 are cross-sectional views of the embodiment of FIG. 28.
Figure 33:
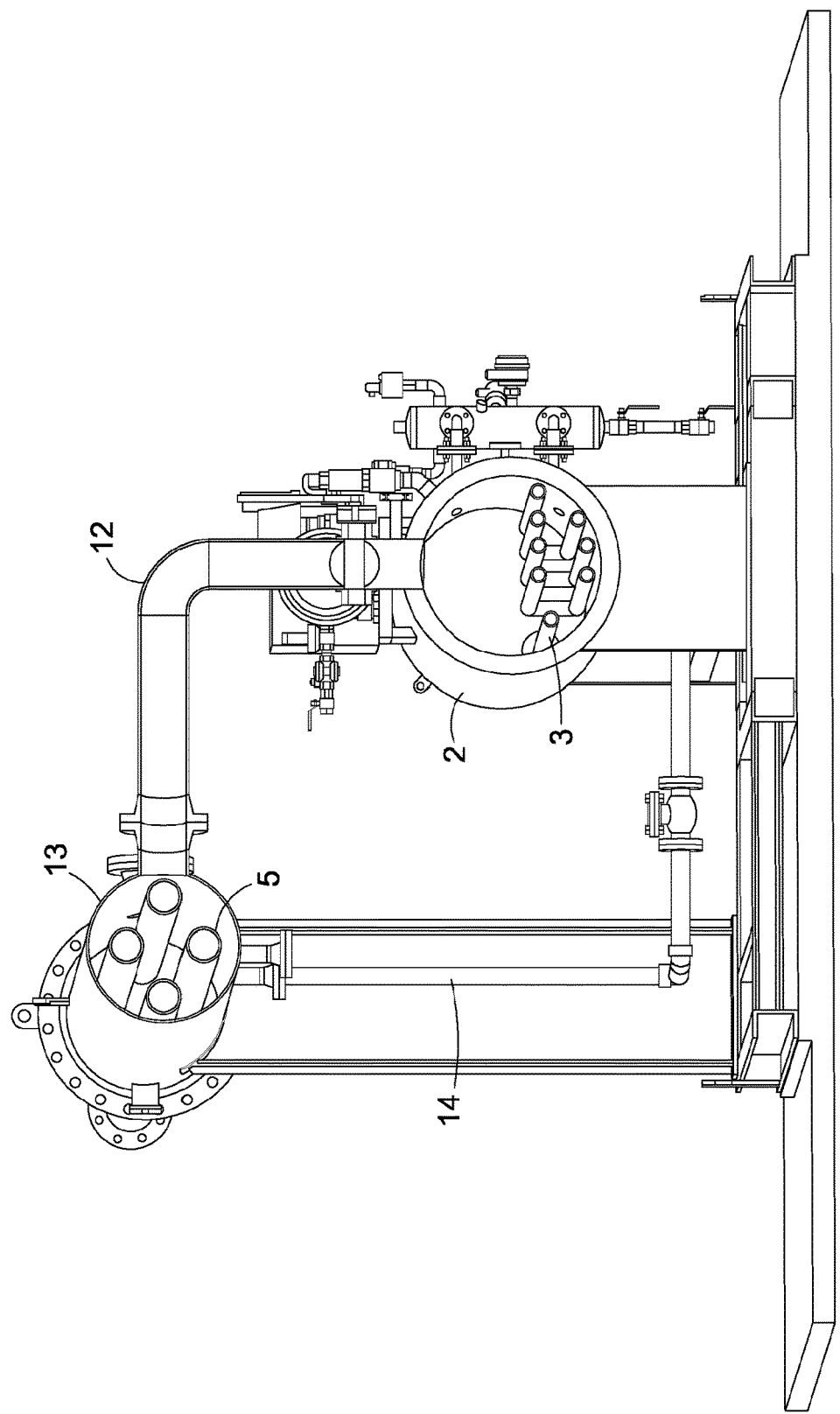

FIGS. 32 and 33 show opposing cross-sectional views taken through the evaporator vessel 2 of FIGS. 28-31.

Figure 34:
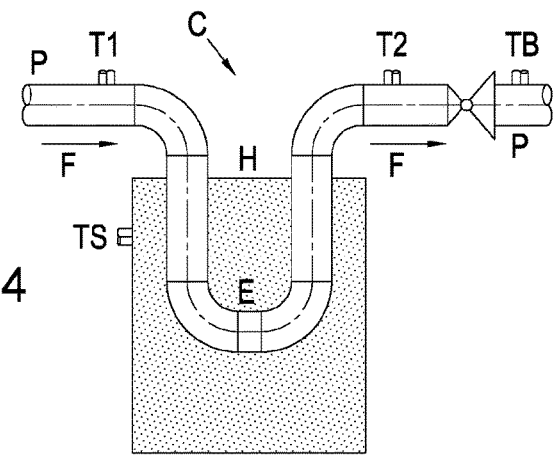
FIG. 34 is a schematic illustration of a natural gas conveyance system according to a fourth embodiment of the invention.

In one particular embodiment of the invention, as shown schematically in FIG. 34, a natural gas conveyance system C is provided. The natural gas conveyance system C broadly includes a natural gas pipeline P and a heat exchange system H. The natural gas pipeline P is configured to have a flow F of natural gas 9 carried therein, with the natural gas pipeline P including an environmentally exposed section E of the pipeline P. The heat exchange system H is configured for the controlled heating of the natural gas 9 within at least a portion of the environmentally exposed section E of the pipeline P.

The heat exchange system H is particularly configured to input heat into the environmentally exposed section E of the pipeline P and, thus, into the flow F of the natural gas 9 carried therein by means of a heat transfer fluid. The heat exchange system H is configured such that the amount of heat generated thereby and thus input into the environmentally exposed section E of the pipeline 9 is controlled (e.g., via one or more thermal controllers 31) based at least in part on a set point or baseline temperature TB of the natural gas in the environmentally exposed section E of pipeline P and/or temperature TS of the heat transfer fluid. The flow F of the natural gas 9 and/or the heat transfer fluid is subjected to heat input via the heat exchange system H as needed to maintain the temperature of the natural gas 9 in the environmentally exposed section E and/or the heat transfer fluid at or above the set point or baseline temperature. The amount of heat added to the flow F of natural gas 9 is preferably limited to baseline or set point temperature TB.

The heat exchange system H associated with the natural gas conveyance system C may include a heating unit and/or an air/heat exchange fluid circulation unit. The heating unit may be in the form of a fuel burner 6 or any other appropriate type of heating unit (e.g., a solar water/fluid heater (not shown)). The air and/or heat exchange fluid circulation unit may include, for example, at least one of a fan, a pump, and a blower 7. A fluid circulation unit could be used to control the rate at which the heat transfer fluid is conveyed within the system and/or to increase the speed at which the heated air generated by the burner 6 is conveyed. That is, aiding the circulation of either type of fluid in the heat exchanger system could improve the heat exchange efficiency and is thus considered contemplated hereby. In one variation, though, a pump for moving the heat transfer fluid may expressly not be provided, sufficient heat transfer fluid movement instead being generated by convection and/or gravity, as explained above in relation to at least one embodiment.

The heat exchange system associated with the natural gas conveyance system C may include at least one thermal controller 31, which may include a thermostat and/or a digital processor. The thermal controller 31 may be configured to control at least one of the circulation rate generated by the air circulation unit and the level of heat provided by the heating unit. The level of heat may, in one variation, be dictated by the heat content of the heated gas in the heat source tube, with the heated gas in the heat source tube being distinguished from the flow F of the natural gas 9 being heated by the heat exchange system.

Figure 35:
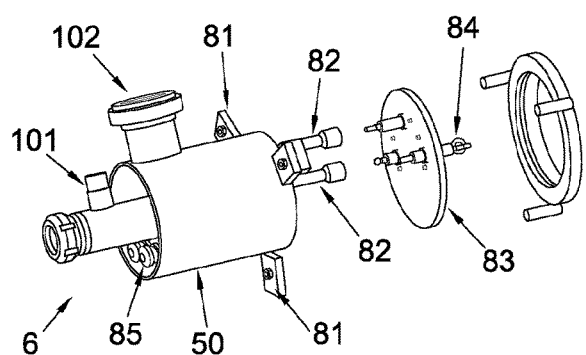
FIG. 35 is an exploded isometric view of a burner.

FIG. 35 illustrates the assembly of the burner 6. Advantageously, the burner 6 comprises a burner head 50 and burner grate 83 whereby air and fuel pass prior to ignition and which controls the shape of the flame. The burner grate 83 preferably comprises an integrated igniter 84 at its centre and an optional flame sensing electrode. However, in a preferred embodiment, a UV flame scanner 86 is instead attached to the burner head 50 to sense the presence of a flame.

The burner 6 further advantageously comprises, as shown in FIG. 35, three (or more) flanges 81 for attaching the burner 6 to the flange of the respective evaporator vessel 2, three or more nuts (not shown) to attach the flanges 81 of the burner 6 to the flange of the evaporator vessel 2, two cable glands 85 for attaching cables to the burner 6 and two electrode connectors 82 for the optional flame sensing electrode. Air and fuel are supplied to the burner head 50 via the pilot air fuel inlet 101 and via the main flame air fuel inlet 102. An additional air and fuel inlet for dual firing stage burners may also be used (not shown).

Figure 38:
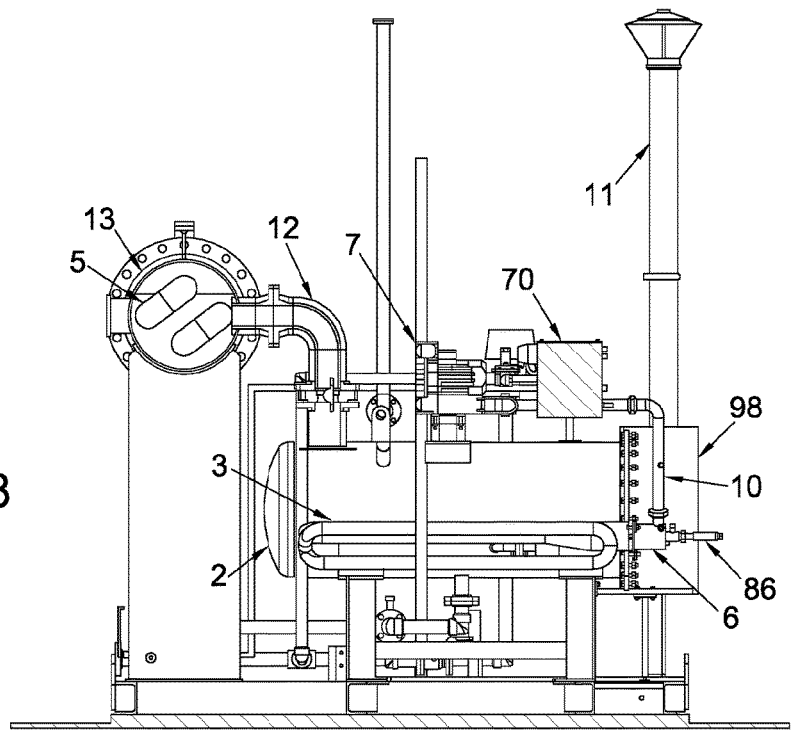
FIG. 38 is an elevation cross-sectional view of the embodiment of FIG. 37.

FIGS. 37 and 38 show a heater 1 according to a fifth embodiment of the invention. The heater 1 shown in FIGS. 13 and 14 is similar to that shown in FIG. 2 and only differences will be described. The heater 1 of FIGS. 37 and 38 comprises an optional heat guard 98 on non-insulated surfaces for protection of personnel. In this embodiment, the heat guard 98 is provided on the end of the evaporator vessel 2 on which the burner 6 is provided. In the present embodiment, an optional UV flame scanner 86 is provided, as shown in FIG. 38.

Figure 39:
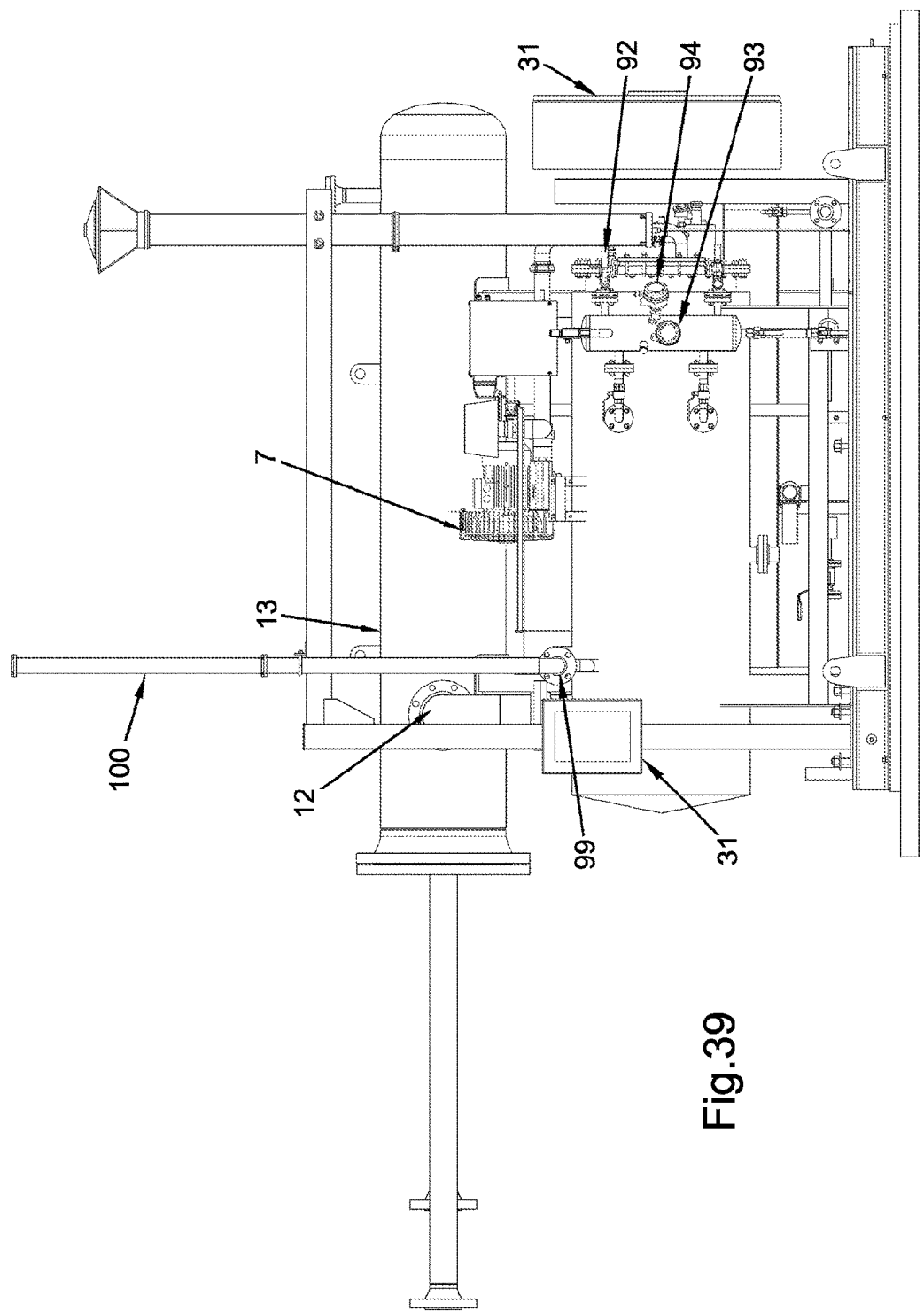
FIG. 39 is an elevation view of a heater according to a sixth embodiment of the invention.
Figure 40:
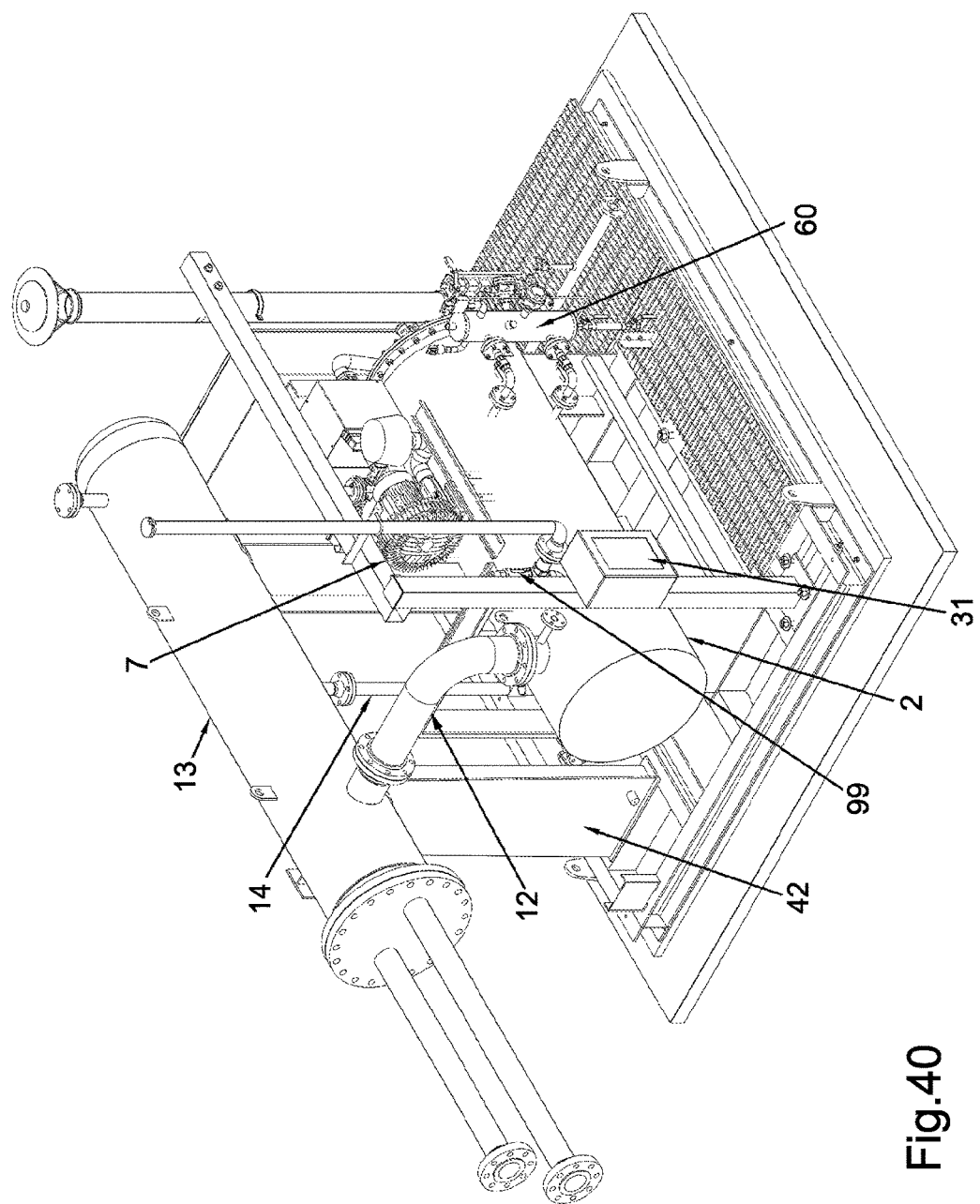
FIG. 40 is an isometric view of the embodiment of FIG. 39.

FIGS. 39 and 40 show a heater 1 according to a sixth embodiment of the invention. The heater 1 shown in FIGS. 39 and 40 is similar to that shown in FIG. 28 and only differences will be described. Referring to FIGS. 39 and 40, the heater 1 comprises an optional mechanical over pressure protection device 99 in the form of a pressure relief valve or bursting disk. The over pressure protection device 99 is set at the safe operating limit of the equipment (in this embodiment the evaporator vessel 2), and is typically set at 0.5 bar. The over pressure protection device 99 is fitted with a pipe which vents over pressurized fluids a safe distance from hazardous areas.

Embodiments of the invention are described in which the heater is used to heat a flow of natural gas. However, the invention is not limited to this, and other the heater can be used to heat other fluids, for example flows of liquids, e.g. on chemical processing sites, or fuel gas for powers stations, or for heating air or other fluids.

The embodiments described above are exemplary only, and modifications thereto may be made by a person skilled in the art without departed from the scope of the invention.

The invention claimed is:

1. A heater for heating a flow of a first gas, comprising:
a vessel containing a heat transfer fluid;
a heat source tube passing through the vessel and being at least partially immersed in the heat transfer fluid, the heat source tube being suppliable with a heated second gas, the heat source tube being configured to allow the heated second gas to flow along and inside the heat source tube to evaporate the heat transfer fluid;
at least one heat exchanger being connectable to a source of the first gas, the at least one heat exchanger being arranged so that the first gas can be heated by the evaporated heat transfer fluid; and
at least one of a fan, pump or blower configured to force the heated second gas along the heat source tube,
wherein the at least one heat exchanger comprises at least one heat transfer tube being connectable to the source of the first gas so that the at least one heat transfer tube is configured such that an entirety of the first gas received from the source of the first gas is directed to flow inside the at least one heat transfer tube and through the at least one heat exchanger, the at least one heat transfer tube being arranged to be heated by the evaporated heat transfer fluid, the heater further comprising a burner to supply the heated second gas to the heat source tube, and a control system for controlling a vessel pressure in the vessel and a fluid temperature of the heat transfer fluid and for controlling at least one of the burner or the at least one of a fan, pump, or blower, the control system configured to control a circulation rate of the heated second gas in the heat source tube using the at least one of a fan, pump, or blower, the control system configured to operate the vessel with the fluid temperature in a range of 40° C. to 90° C. and with the vessel pressure in an absolute pressure range of 50 mbar to 340 mbar, the control system comprising a digital controller incorporating a thermo-controller, wherein the vessel is an evaporator vessel, the at least one heat exchanger further comprising a condenser vessel in fluid communication with the evaporator vessel via a piping circuit to allow the heat transfer fluid to flow between the evaporator vessel and the condenser vessel in the piping circuit, the at least one heat transfer tube passing through the condenser vessel of the at least one heat exchanger, the evaporator vessel, the condenser vessel, and the at least one heat transfer tube together comprising a sealed fluid system operating under vacuum with the vessel pressure in the absolute pressure range of 50 mbar to 340 mbar, the sealed fluid system employing a fixed mass of the heat transfer fluid held under vacuum in the absolute pressure range of 50 mbar to 340 mbar.

2. The heater according to claim 1, wherein the center of gravity of the condenser vessel is above the center of gravity of the evaporator vessel in an operating condition of the heater.

3. The heater according to claim 1, wherein the heat transfer fluid comprises water and/or propylene glycol or ethylene glycol.

4. The heater according to claim 1, wherein the heat source tube includes at least two straight sections and at least one curved section, the heat source tube defining a sinuous path, the heat source tube tapered along a length of the heat source tube residing within the evaporator vessel in a direction from an inlet to an outlet of the heat source tube, the tapering of the heat source tube decreasing a surface area of the heat source tube thereby promoting compactness of the heat source tube.

5. The heater according to claim 1, wherein the heat source tube has a cone-shaped inlet where the heat source tube enters the evaporator vessel from the burner and an outlet where the heat source tube leaves the evaporator vessel, and the heat source tube is tapered along a length of the heat source tube residing within the evaporator vessel in a direction from the inlet to the outlet.

6. The heater according to claim 1, wherein a single heat source tube passes through the evaporator vessel.

7. The heater according to claim 1, wherein at least a portion of the heat source tube follows a substantially horizontal path inside the vessel in an operating condition of the heater.

8. The heater according to claim 1, wherein the control system is configured to control the at least one of the fan, pump or blower.

9. The heater according to claim 1, wherein the control system is configured to control the burner based on achieving a required temperature of the heat transfer fluid and/or the first gas.

10. The heater according to claim 9, wherein both the heat transfer fluid and the first gas have a corresponding required temperature, the required temperature of the heat transfer fluid being above the required temperature of the first gas.

11. The heater according to claim 9, wherein the control system is configured to control the burner based on achieving a required temperature of the first gas.

12. The heater according to claim 1, wherein one or more temperature sensors are provided to measure a temperature of the first gas after it has passed through the heat transfer tube, or after it has passed through the heat transfer tube and undergone pressure let-down or to measure the temperature of the heat transfer fluid in the evaporator vessel or condenser vessel, and wherein the control system is configured to control at least one of the burner or the at least one of the fan, pump or blower based on an output of one or more of the temperature sensors.

13. The heater according to claim 1, the heater further comprising an isolation vessel connected to the evaporator vessel, the isolation vessel being configured to receive and isolate heat transfer fluid from the evaporator vessel, the heater comprising one or more sensors configured to measure pressure inside the evaporator vessel, wherein the one or more sensors are provided on the isolation vessel.

14. The heater according to claim 1, wherein the condenser vessel is separate from the evaporator vessel.

15. A heater for heating a flow of a first gas, comprising:
a vessel containing a heat transfer fluid;
a heat source tube passing through the vessel and being at least partially immersed in the heat transfer fluid, the heat source tube being suppliable with a heated second gas, the heat source tube configured to allow the heated second gas to flow along and inside the heat source tube to evaporate the heat transfer fluid; and
at least one heat exchanger connectable to a source of the first gas, the at least one heat exchanger arranged so that the first gas can be heated by the evaporated heat transfer fluid,
wherein the at least one heat exchanger comprises at least one heat transfer tube connectable to the source of the first gas so that the first gas is directed to flow inside the at least one heat transfer tube, the at least one heat transfer tube being arranged to be heated by the evaporated heat transfer fluid,
wherein the heater further comprises a burner to supply the heated second gas to the heat source tube, and a control system for controlling a vessel pressure of the vessel and a fluid temperature of the heat transfer fluid, the control system configured to operate the vessel with the fluid temperature in a range of 40° C. to 90° C. and with the vessel pressure in an absolute pressure range of 50 mbar to 340 mbar, the control system comprising a digital controller incorporating a thermo-controller,
wherein the vessel is an evaporator vessel, the at least one heat exchanger further comprising a condenser vessel in fluid communication with the evaporator vessel via a piping circuit to allow the heat transfer fluid to flow between the evaporator vessel and the condenser vessel in the piping circuit, the at least one heat transfer tube passing through the condenser vessel of the at least one heat exchanger, the evaporator vessel, the condenser vessel, and the at least one heat transfer tube together comprising a sealed fluid system operating under vacuum with the vessel pressure in the absolute pressure range of 50 mbar to 340 mbar, the sealed fluid system employing a fixed mass of the heat transfer fluid held under vacuum in the absolute pressure range of 50 mbar to 340 mbar, wherein the heat source tube has an inlet where the heat source tube enters the evaporator vessel from the burner and an outlet where the heat source tube leaves the evaporator vessel, and the heat source tube is tapered along a length of the heat source tube located within the evaporator vessel in a direction from the inlet to the outlet, the heat source tube including at least two straight sections and at least one curved section, the heat source tube defining a sinuous path, the tapering of the heat source tube decreasing a surface area of the heat source tube thereby promoting compactness of the heat source tube.

16. A heater for heating a flow of a first fluid, comprising:

a vessel containing a heat transfer fluid;

a heat source tube passing through the vessel and being at least partially immersed in the heat transfer fluid, the heat source tube being suppliable with a heated gas, the heat source tube configured to allow the heated gas to flow along and inside the heat source tube to evaporate the heat transfer fluid; and at least one heat exchanger connectable to a source of the first fluid, the at least one heat exchanger arranged so that the first fluid can be heated by the evaporated heat transfer fluid, wherein the at least one heat exchanger comprises at least one heat transfer tube connectable to the source of the first fluid so that the at least one heat transfer tube is configured such that an entirety of the first fluid received from the source of the first fluid is directed to flow inside the at least one heat transfer tube and through the at least one heat exchanger, the at least one heat transfer tube arranged to be heated by the evaporated heat transfer fluid, wherein the heater further comprises a burner to supply the heated gas to the heat source tube, and a control system for controlling a vessel pressure in the vessel and a fluid temperature of the heat transfer fluid, the control system configured to operate the vessel with a vessel temperature in a range of 40° C. to 90° C. and with the vessel pressure in an absolute pressure range of 50 mbar to 340 mbar, the control system comprising a digital controller incorporating a thermo-controller, wherein the vessel is an evaporator vessel, the at least one heat exchanger further comprising a condenser vessel in fluid communication with the evaporator vessel via a piping circuit to allow the heat transfer fluid to flow between the evaporator vessel and the condenser vessel in the piping circuit, and the at least one heat transfer tube passing through the condenser vessel of the at least one heat exchanger, the evaporator vessel, the condenser vessel, and the at least one heat transfer tube together comprising a sealed fluid system operating under vacuum with the vessel pressure in the absolute pressure range of 50 mbar to 340 mbar, the sealed fluid system employing a fixed mass of the heat transfer fluid held under vacuum in the absolute pressure range of 50 mbar to 340 mbar, wherein one or more temperature sensors are provided to measure a temperature of the first fluid after it has passed through the heat transfer tube, or after it has passed through the heat transfer tube and undergone pressure let-down or to measure the temperature of the heat transfer fluid in the vessel or condenser vessel, and wherein the control system is further configured to control a circulation rate of the heated gas based on an output of one or more of the temperature sensors.

17. The heater according to claim 16, further comprising at least one of a fan, pump, or blower configured to force the heated gas along the heat source tube, the control system configured to control the at least one of the fan, pump, or blower to adjust the circulation rate of the heated gas.

\* \* \* \* \*